United States Patent
Matsushita et al.

(10) Patent No.: US 10,115,969 B2
(45) Date of Patent: Oct. 30, 2018

(54) BATTERY, ELECTRODE, BATTERY PACK, ELECTRONIC DEVICE, ELECTRIC VEHICLE, POWER STORAGE DEVICE, AND POWER SYSTEM

(71) Applicant: Sony Corporation, Tokyo (JP)

(72) Inventors: Tadashi Matsushita, Fukushima (JP); Takehiko Ishii, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 54 days.

(21) Appl. No.: 14/049,324

(22) Filed: Oct. 9, 2013

(65) Prior Publication Data
US 2014/0120417 A1 May 1, 2014

(30) Foreign Application Priority Data
Oct. 30, 2012 (JP) .................... 2012-238572

(51) Int. Cl.
*H01M 4/66* (2006.01)
*H01M 2/26* (2006.01)
(Continued)

(52) U.S. Cl.
CPC ........... *H01M 4/667* (2013.01); *B60L 3/0046* (2013.01); *B60L 7/10* (2013.01); *B60L 11/12* (2013.01);
(Continued)

(58) Field of Classification Search
None
See application file for complete search history.

(56) References Cited

U.S. PATENT DOCUMENTS 5,622,789 A * 4/1997 Young .................. 429/7
2002/0121396 A1* 9/2002 Ovshinsky et al. ......... 180/65.3
(Continued)

FOREIGN PATENT DOCUMENTS

EP  1137091     9/2001
JP  10-241696   9/1998
(Continued)

OTHER PUBLICATIONS

European Patent Office, Extended European search report issued in connection with European Application No. 13004881.2, dated Mar. 5, 2014. (5 pages).

(Continued)

*Primary Examiner* — Sarah A. Slifka
*Assistant Examiner* — Haroon S. Sheikh
(74) *Attorney, Agent, or Firm* — K&L Gates LLP

(57) ABSTRACT

There is provided a battery including a positive electrode, and a negative electrode. At least one electrode of the positive electrode and the negative electrode includes a current collector, a mixture layer over one main surface of the current collector, the mixture layer including a gap through which a part of the current collector is exposed, a lead bonded to an exposed surface of the current collector exposed through the gap, and a protective layer configured to protect the current collector, at least a part of the protective layer being over the exposed surface of the current collector and interposed between a part of the lead and the exposed surface. The part of the lead includes at least a part of a peripheral edge of the lead.

19 Claims, 14 Drawing Sheets

(51) Int. Cl.
*H01M 10/0587* (2010.01)
*H01M 4/13* (2010.01)
*H01M 10/052* (2010.01)
*B60L 3/00* (2006.01)
*B60L 7/10* (2006.01)
*B60L 11/12* (2006.01)
*H01M 10/42* (2006.01)
*H01M 6/16* (2006.01)

(52) U.S. Cl.
CPC .............. *H01M 2/26* (2013.01); *H01M 4/13* (2013.01); *H01M 10/052* (2013.01); *H01M 10/0587* (2013.01); *H01M 6/16* (2013.01); *H01M 10/4235* (2013.01); *H01M 2200/00* (2013.01); *Y02E 60/122* (2013.01); *Y02T 10/7011* (2013.01); *Y02T 10/7077* (2013.01)

(56) References Cited

U.S. PATENT DOCUMENTS

| | | |
|---|---|---|
| 2003/0224242 A1 | 12/2003 | Kaito et al. |
| 2010/0178559 A1* | 7/2010 | Mao et al. .................... 429/211 |
| 2011/0014510 A1 | 1/2011 | Miyahisa et al. |
| 2011/0081574 A1* | 4/2011 | Jo .......................... H01M 2/263 |
| | | 429/211 |
| 2011/0159344 A1* | 6/2011 | Kobayashi .............. H01M 4/13 |
| | | 429/130 |

FOREIGN PATENT DOCUMENTS

| | | |
|---|---|---|
| JP | 11-265703 | 9/1999 |
| JP | 2002-100364 | 4/2002 |
| JP | 2004-055537 | 2/2004 |
| JP | 2004-311146 | 11/2004 |
| JP | 2004-311282 | 11/2004 |
| JP | 2007-165224 | 6/2007 |
| JP | 2009-076301 | 4/2009 |
| JP | 2009-134971 | 6/2009 |
| JP | 2010-212086 | 9/2010 |
| JP | 2012-113995 | 6/2012 |
| JP | 2012-138335 | 7/2012 |

OTHER PUBLICATIONS

Office Action issued in JP Application 2012238572, dated Nov. 10, 2015 (6 pages).
Office Action issued in CN Application 201310499920.8, dated Feb. 26, 2016 (16 pages).
Japanese Office Action dated Jul. 5, 2016 in corresponding Japanese application No. 2012-238572 (3 pages).

* cited by examiner ations.

BATTERY, ELECTRODE, BATTERY PACK, ELECTRONIC DEVICE, ELECTRIC VEHICLE, POWER STORAGE DEVICE, AND POWER SYSTEM

CROSS REFERENCES TO RELATED APPLICATIONS

The present application claims priority to Japanese Priority Patent Application JP 2012-238572 filed in the Japan Patent Office on Oct. 30, 2012, the entire content of which is hereby incorporated by reference.

BACKGROUND

The present application relates to a battery, an electrode, a battery pack, an electronic device, an electric vehicle, a power storage device, and a power system.

Expectations and the market for a battery using a non-aqueous electrolyte solution, in particular, a lithium ion secondary battery, are growing increasingly because such a battery can have a higher energy density than a lead-acid battery or a nickel-cadmium battery, which is an aqueous-based electrolyte solution secondary battery according to the related art. Specifically, since characteristics of the lithium ion secondary battery, such as lightness and the high energy density, can be suitably applied to electric cars and hybrid electric cars, the battery has been extensively studied in recent years in order to obtain larger sizes and higher outputs.

In particular, in order to use a cell with higher output, a structure has been proposed in which a mixture layer is positioned on the left and right sides of a positive electrode lead. Thus, the cell resistance can be lowered and a cell with higher output can be obtained (see JP 2004-311282A and JPH 10-241696A).

In addition, as for the secondary battery, a variety of techniques have been proposed regarding bonding of an electrode body, a lead, and a current collector. For example, in JP 2010-212086A, a technique to suppress a break of the current collector is proposed (see JP 2010-212086A). For example, in JP 2009-134971A, an ultrasonic welding method of a positive electrode current collector and a tab is proposed in order to provide a lithium ion battery with excellent mechanical strength and shock resistance (see JP 2009-134971A).

SUMMARY

In a portion where the current collector is in contact with the lead in the battery, suppression of a cut of the current collector has been expected.

According to an embodiment of the present application, there is provided a battery, an electrode, a battery pack, an electronic device, an electric vehicle, a power storage device, and a power system which can suppress the cut of the current collector.

According to an embodiment of the present application, there is provided a battery including a positive electrode, and a negative electrode. At least one electrode of the positive electrode and the negative electrode includes a current collector, a mixture layer over one main surface of the current collector, the mixture layer including a gap through which a part of the current collector is exposed, a lead bonded to an exposed surface of the current collector exposed through the gap, and a protective layer configured to protect the current collector, at least a part of the protective layer being over the exposed surface of the current collector and interposed between a part of the lead and the exposed surface. The part of the lead includes at least a part of a peripheral edge of the lead.

According to another embodiment of the present application, there is provided an electrode including a current collector, a mixture layer over one main surface of the current collector, the mixture layer including a gap through which a part of the current collector is exposed, a lead bonded to an exposed surface of the current collector exposed through the gap, and a protective layer configured to protect the current collector, at least a part of the protective layer being over the exposed surface of the current collector and interposed between a part of the lead and the exposed surface. The part of the lead includes at least a part of a peripheral edge of the lead.

Further, a battery pack, an electronic device, an electric vehicle, a power storage device, and a power system according to embodiments of the present application include the above battery.

According to one or more of embodiments of the present application, there is provided a structure including a protective layer configured to protect the current collector, at least a part of the protective layer being over an exposed surface of the current collector and interposed between a part of the lead and the exposed surface, and the part of the lead includes at least a part of a peripheral edge of the lead. This structure can suppress the cut of the current collector.

According to one or more of embodiments of the present application, the cut of the current collector can be suppressed.

Additional features and advantages are described herein, and will be apparent from the following Detailed Description and the figures.

DETAILED DESCRIPTION

Figure 1:
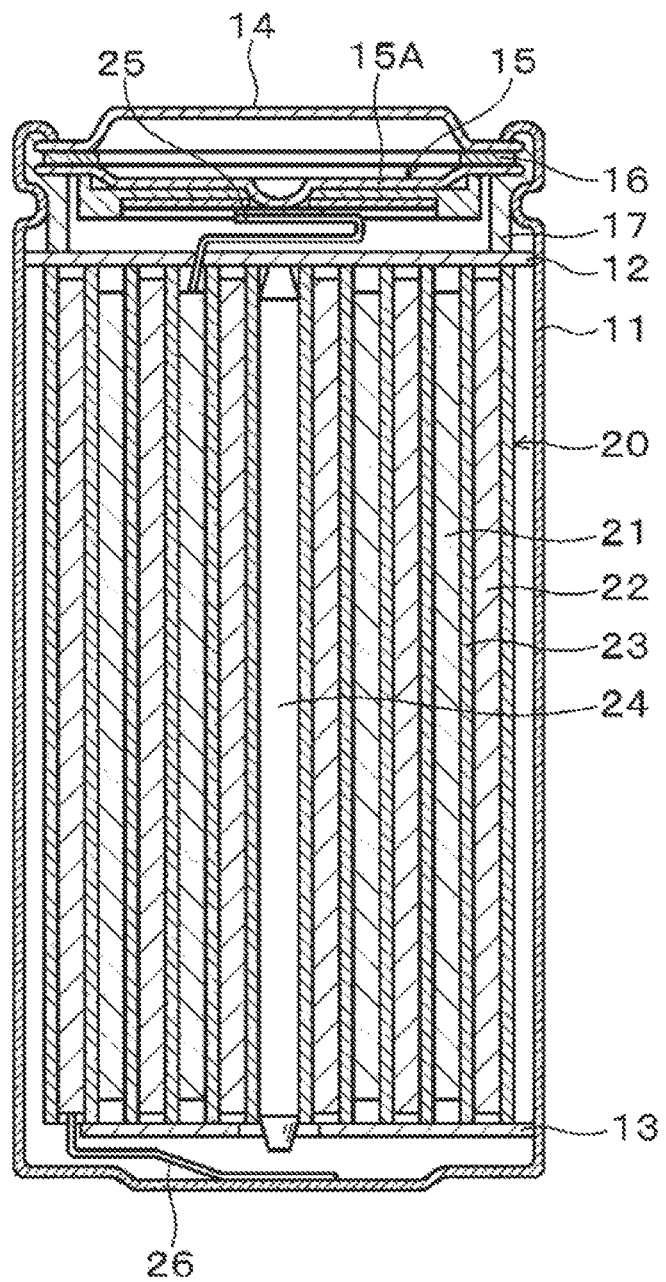
FIG. 1 is a cross-sectional view showing a structural example of a non-aqueous electrolyte battery according to an embodiment of the present application.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted. Note that the description will be made in the following order.

1. First embodiment (example of cylindrical battery)
2. Second embodiment (example of battery pack using the battery)
3. Third embodiment (examples of power storage system and the like using the battery)
4. Other embodiments (modified examples)

1. First Embodiment (Structure of Battery)

Figure 2:
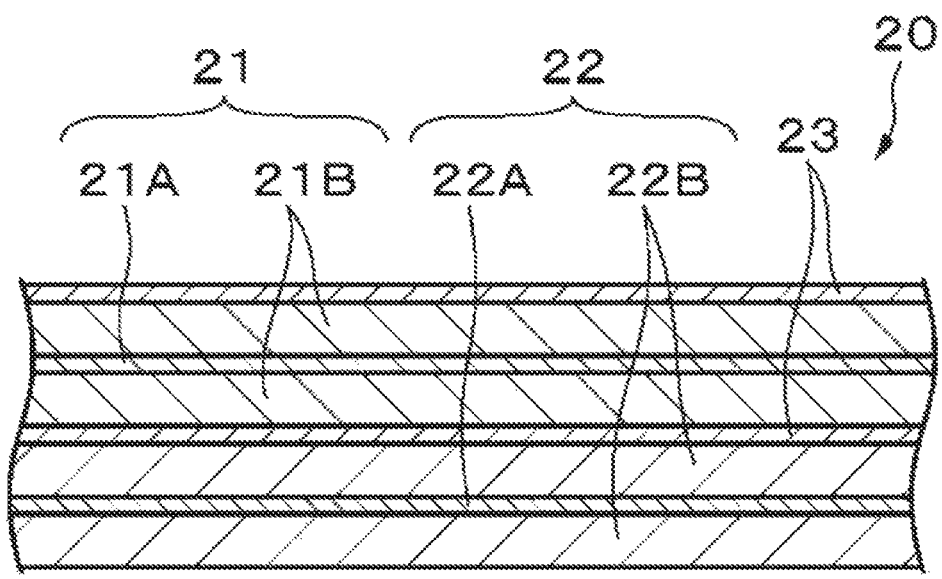
FIG. 2 is a cross-sectional view showing an enlarged part of a wound electrode body shown in FIG. 1.
Figure 3:
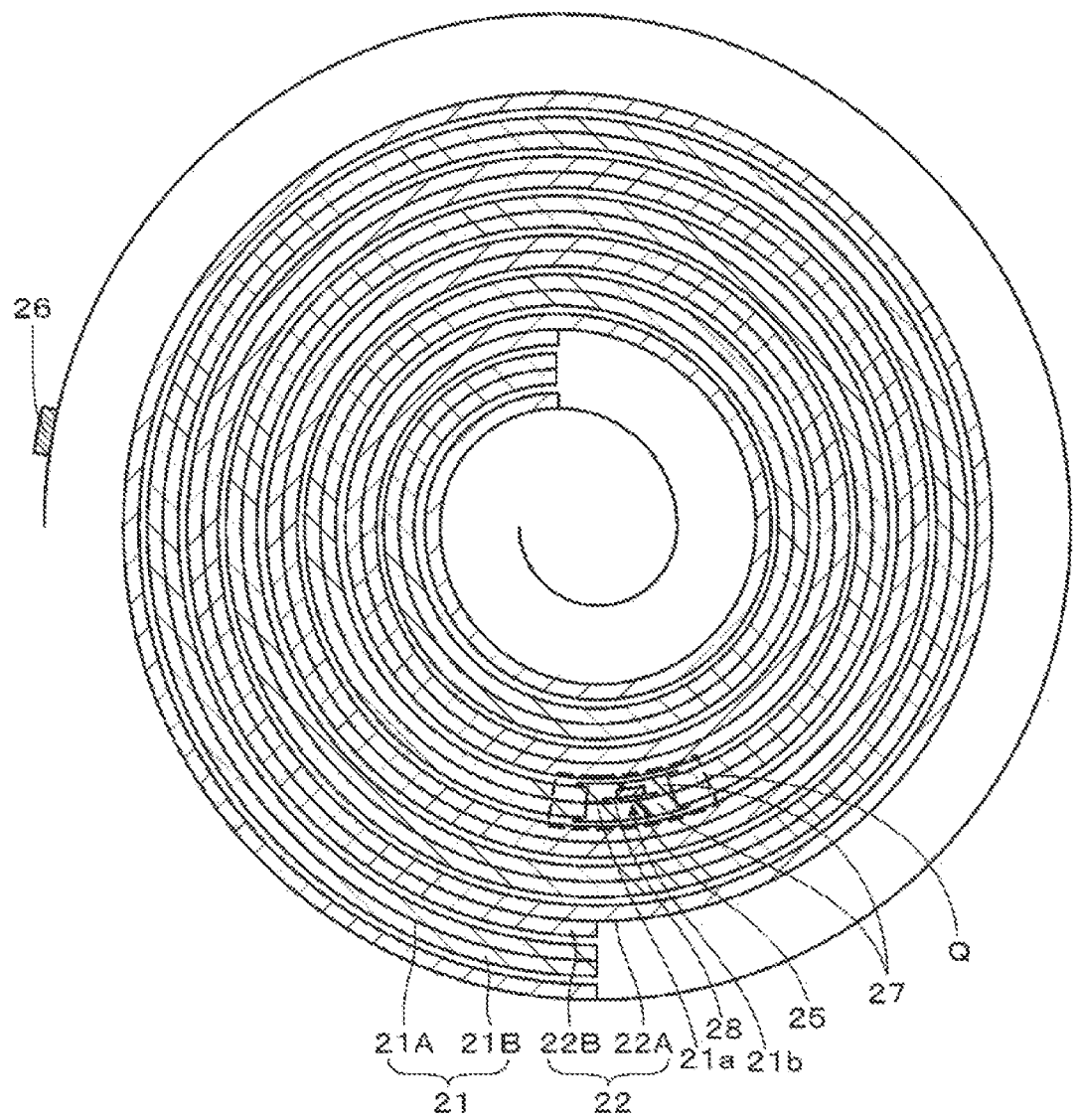
FIG. 3 is a cross-sectional view of a surface where the wound electrode body is wound.

A non-aqueous electrolyte battery according to a first embodiment of the present application will be described with reference to drawings. FIG. 1 shows a cross-sectional structure of the non-aqueous electrolyte battery according to the first embodiment of the present application. FIG. 2 is a partial cross-sectional view showing an enlarged part of a wound electrode body 20 shown in FIG. 1. FIG. 3 is a cross-sectional view showing a surface where the wound electrode body is wound. Note that in FIG. 3, illustration of a separator is omitted.

The non-aqueous electrolyte battery is, for example, a secondary battery capable of charging and discharging, such as a lithium ion secondary battery in which the capacity of a negative electrode 22 is represented on the basis of intercalation and deintercalation of lithium, which is an electrode reaction substance.

As shown in FIG. 1, in the non-aqueous electrolyte battery, mainly, the wound electrode body 20 formed by laminating a positive electrode 21 and the negative electrode 22 with a separator 23 interposed therebetween and winding the laminate, and a pair of insulating plates 12 and 13 are housed in the inside of a substantially hollow columnar battery can 11. A battery structure using the columnar battery can 11 is called cylindrical type.

For example, the battery can 11 has a hollow structure in which one end portion is closed and the other end portion is open, and is formed using iron (Fe), aluminum (Al), an alloy thereof, or the like. Note that when the battery can 11 is formed using iron, for example, a surface of the battery can 11 may be plated with nickel (Ni) or the like. The pair of insulating plates 12 and 13 are positioned such that the wound electrode body 20 is interposed between the insulating plates 12 and 13 in the up-down direction and the insulating plates 12 and 13 are extended to be perpendicular to the surface where the wound electrode body 20 is wound.

In the open end portion of the battery can 11, a battery cap 14, a safety valve mechanism 15, and a positive temperature coefficient (PTC) element 16 are chalked via a gasket 17, and the battery can 11 is hermetically sealed. The battery cap 14 is formed using, for example, the same material as the battery can 11. The safety valve mechanism 15 and the positive temperature coefficient element 16 are provided in the inside of the battery cap 14. The safety valve mechanism 15 is electrically connected to the battery cap 14 via the positive temperature coefficient element 16. With this safety valve mechanism 15, when the internal pressure becomes greater than or equal to a certain value due to internal short circuit, heating from the outside, or the like, a disk plate 15A is reversed and electrical connection between the battery cap 14 and the wound electrode body 20 is cut off. As the temperature rises, the resistance of the positive temperature coefficient element 16 is increased (current is restricted), so that the positive temperature coefficient element 16 prevents abnormal heat generation due to overcurrent. The gasket 17 is formed using an insulating material for example, and a surface thereof is coated with asphalt for example.

As shown in FIGS. 2 and 3, the wound electrode body 20 is formed by laminating the belt-like positive electrode 21 and the belt-like negative electrode 22 with the separator 23 interposed therebetween and winding the laminate.

A center pin 24 is inserted to the center of the wound electrode body 20. In the wound electrode body 20, a lead 25 formed using aluminum or the like is connected to the positive electrode 21, and a lead 26 formed using nickel or the like is connected to the negative electrode 22. The lead 25 is electrically connected to the battery cap 14 by being welded, to the safety valve mechanism 15, and the lead 26 is electrically connected to the battery can 11 by being welded. One lead 26 connected to the negative electrode 22 is provided in an end portion of a belt-like negative electrode current collector 22A on a winding ending side.

(Positive Electrode)

As shown in FIG. 3, the positive electrode 21 is formed by forming a positive electrode mixture layer 21B such as to have a both-surface non-coated portion 21b where the positive electrode mixture layer 21B is not formed on one main surface and the other main surface of a positive electrode current collector 21A. In the positive electrode 21, for example, from an end portion on a winding starting side to the other end portion on the winding ending side, a portion where the positive electrode mixture layer 21B is formed on both of the main surfaces of the positive electrode current collector 21A, the both-surface non-coated portion 21b where the positive electrode mixture layer 21B is not formed on the one main surface and the other main surface of the positive electrode current collector 21A, and a portion where the positive electrode mixture layer 21B is formed on both the main surfaces of the positive electrode current collector 21A are provided in this order. Further, the positive electrode mixture layer 21B provided on the one main surface and the other main surface of the positive electrode current collector 21A has, on both surfaces, a gap through which a part of the positive electrode current collector 21A is exposed in the both-surface non-coated portion 21b. The gap in the both-surface non-coated portion 21b is provided in, for example, an almost central portion in the longitudinal direction of the belt-like positive electrode 21. The positive electrode current collector 21A includes a positive electrode current collector exposed surface 21a which is exposed through the gap of the positive electrode mixture layer 21B.

In the both-surface non-coated portion 21b, for example, the lead 25 having a rectangular shape or the like, and a protective layer 28 are provided, and the positive electrode 21 has a structure in which the positive electrode mixture layer 21B is positioned on the left and right sides of the lead 25. The lead 25 is, for example, bonded to the positive electrode current collector exposed surface 21a which is exposed through the gap of the positive electrode mixture layer 21B, the gap being provided on the one main surface of the positive electrode current collector 21A, by welding a portion of the lead 25 which does not overlap with the protective layer 28 by an ultrasonic welding or the like, for example.

At least a part of the protective layer 28 is interposed between at least a part of the peripheral edge of the lead 25 and the positive electrode current collector exposed surface 21a. Note that a detailed structure of the protective layer 28 will be described later.

(Effects of Protective Layer in Comparison with Related Art)

As shown in FIG. 3, in the battery using a structure in which the positive electrode mixture layer 21B is positioned on the left and right sides of the lead 25, the lead 25 connected to the positive electrode 21 is positioned at a halfway point of a radius of the wound electrode body 20. Therefore, the influence of the expansion and shrinkage of a positive electrode mixture and a negative electrode mixture during charge/discharge is so strong that the positive electrode current collector 21A (current collector foil) is likely to be cut in a contact portion of the lead 25 and the positive electrode current collector 21A. In particular, a portion of the positive electrode current collector exposed surface 21a, which is in contact of the peripheral edge of the lead 25, is strongly influenced by the expansion and shrinkage of the positive electrode mixture and the negative electrode mixture during charge/discharge and is likely to be cut.

By contrast, according to the present application, at least a part of the protective layer 28 is interposed between at least the part of the peripheral edge of the lead 25 and the positive electrode current collector exposed surface 21a. Therefore, it is possible to suppress a foil cut of the positive electrode current collector 21A due to the expansion and shrinkage during charge/discharge cycles, and to obtain a battery with excellent safety and reliability.

On the other hand, as described in BACKGROUND, the structure in which the mixture layer is positioned on the left and right sides of the lead is disclosed in JP 2004-311282A and JPH 10-241696A. However, JP 2004-311282A and JPH 10-241696A do not disclose that the structure in which the mixture layer is positioned on the left and right sides of the lead is strongly influenced by the expansion and shrinkage of the mixture layer and likely to generate a foil cut in a contact portion of the lead and the current collector.

JP 2010-212086A discloses a technique to suppress a break of the current collector. However, the technique in JP 2010-212086A is to suppress a break in an end portion of the current collector on a winding ending side of the wound electrode body, and is not applied to suppression of a break of the current collector in the structure in which the mixture layer is positioned on the left and right sides of the lead.

JP 2009-134971A discloses a technique about welding of the lead. However, JP 2009-134971A does not disclose that the structure in which the mixture layer is positioned on the left and right sides of the lead is strongly influenced by the expansion and shrinkage of the mixture layer and likely to generate a foil cut in a contact portion of the lead and the current collector.

(Protective Tape)

A protective tape 27 covers, on the one main surface side of the positive electrode current collector 21A, the positive electrode current collector exposed surface 21a, the lead 25, and the protective layer 28, and, on the other main surface side of the positive electrode current collector 21A, the positive electrode current collector exposed surface 21a. This protective tape 27 is provided in order to prevent a thermal runaway of the battery when, for example, the separator or the like is split in an abnormal case of the battery, and the positive electrode 21 and the negative electrode 22 are in contact with each other. The protective tape 27 is, for example, a resin tape or the like.

(Structure of Protective Layer)

Figure 4:
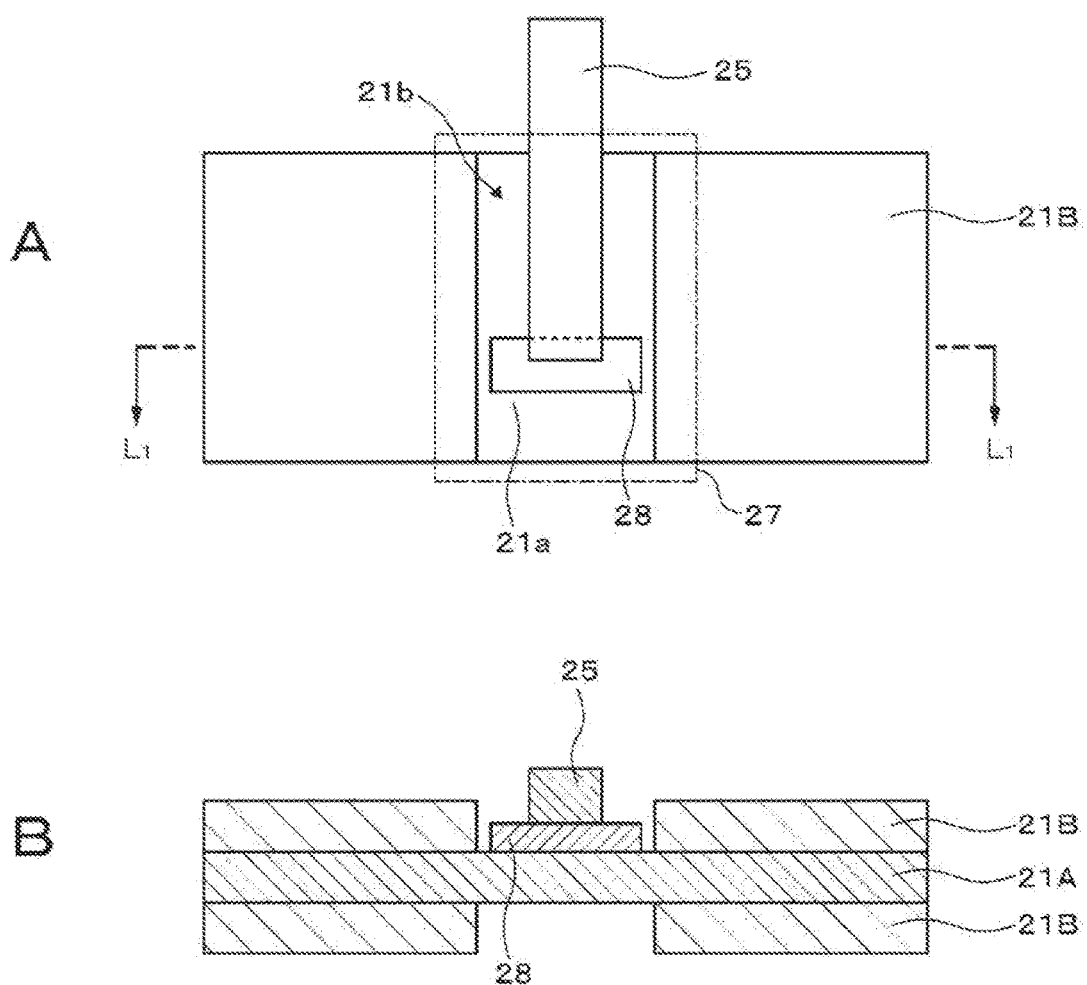
FIG. 4A is a partial top view of a region Q in FIG. 3 when observed from one main surface side of a current collector.
FIG. 4B is a cross-sectional view along a line $L_1$-$L_1$ in FIG. 4A.

A structural example of the protective layer 28 will be described in detail. FIG. 4A is a partial top view of a region Q in FIG. 3 when observed from the one main surface side of the current collector. FIG. 4B is a cross-sectional view along a line $L_1$-$L_1$ in FIG. 4A.

As shown in FIGS. 4A and 4B, in the both-surface non-coated portion 21b, the protective layer 28 having a rectangular plane shape is formed over the positive electrode current collector exposed surface 21a. The protective layer 28 is formed in an almost center of the both-surface non-coated portion 21b. As described above, at least the part of the protective layer 28 is interposed between at least the part of the peripheral edge of the lead 25 and the positive electrode current collector exposed surface 21a. Note that, in the peripheral edge of the lead 25, one edge on the electrode side in the direction intersecting with the current collector is referred to as bottom edge and the other edge is referred to as top edge. Further, two edges connecting the respective both ends of the top edge and the respective both ends of the bottom edge are each referred to as side edge.

In an example shown in FIGS. 4A and 4B, a part of the center of the protective layer 28 is interposed between a bottom portion of the lead 25 and the positive electrode current collector exposed surface 21a such that the part of the protective layer 28 is interposed between a part of the bottom edge of the lead 25 and the both side edges of the lead 25 and the positive electrode current collector exposed surface 21a.

Examples of the protective layer 28 include a resin layer, an inorganic material layer, and the like. Examples of the resin layer include a resin film, a resin tape, and the like. Examples of the resin film include a resin coated film coated with a resin such as a polyvinylidene difluoride (PVdF) film. Examples of the resin tape include a polypropylene (PP) tape, a polyimide (PI) tape, a polyethylene terephthalate (PET) tape, and the like. Examples of the inorganic material layer and the like include an inorganic tape and the like. Examples of the inorganic tape include a carbon tape and the like.

(Other Structural Example of Protective Layer)

Note that the protective layer 28 is not limited to the structural example shown in FIGS. 4A and 4B. The protective layer 28 may have a structure in which at least the part of the protective layer 28 is interposed between at least the part of the peripheral edge of the lead 25 and the positive electrode current collector exposed surface 21a. For example, the structure of the protective layer 28 may be one of other first to third structural examples described below.

(Other First Structural Example of Protective Layer)

Figure 5:
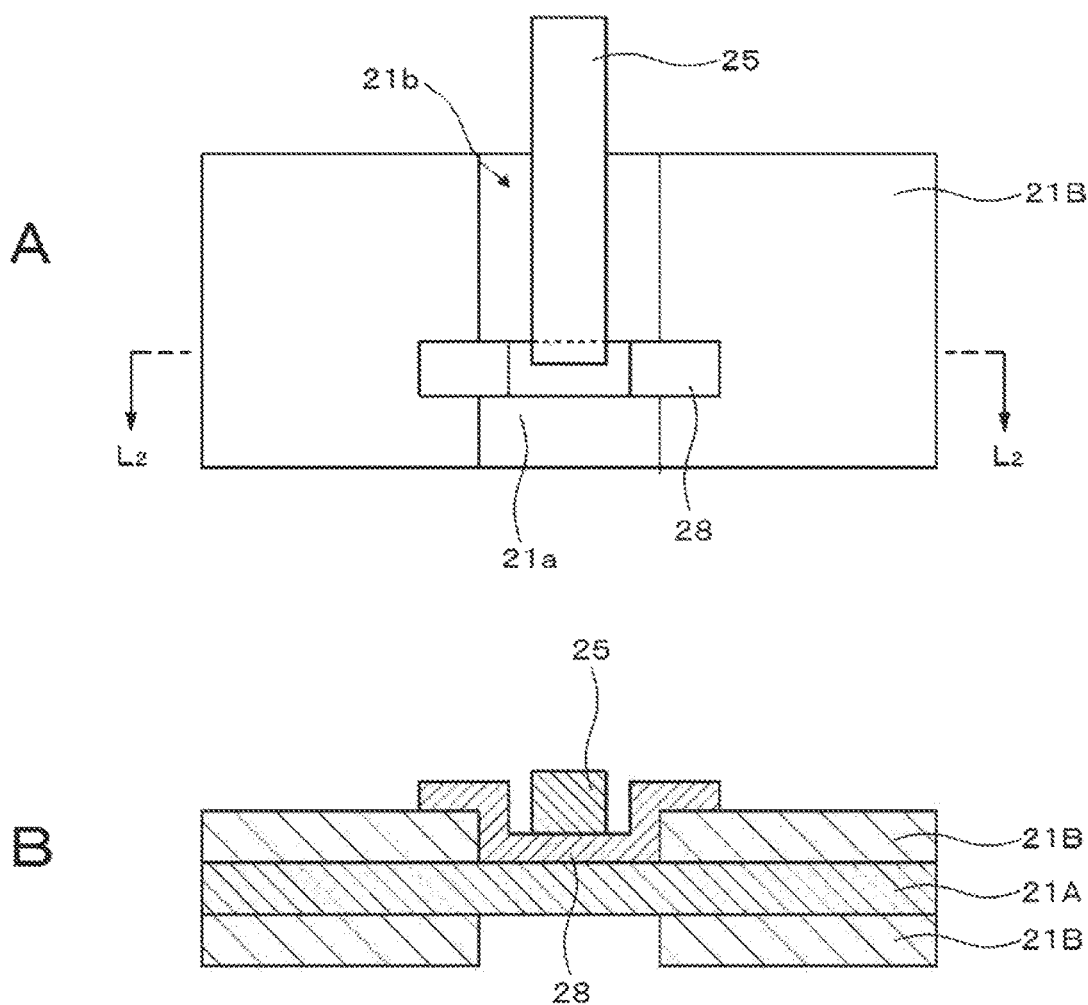
FIG. 5A is a top view of the region Q in FIG. 3 in a case where a protective layer is formed according to other first structural example.
FIG. 5B is a cross-sectional view along a line $L_2$-$L_2$ in FIG. 5A.

The other first structural example of the protective layer will be described with reference to FIGS. 5A and 5B. FIG. 5A is a top view of the region Q in FIG. 3 in a case where the protective layer is formed according to the other first structural example. FIG. 5B is a cross-sectional view along a line $L_2$-$L_2$ in FIG. 5A. Note that in FIGS. 5A and 5B, illustration of the protective tape 27 is omitted.

As shown in FIGS. 5A and 5B, the protective layer 28 having a rectangular plane shape is formed in the both-surface non-coated portion 21b. A central portion of the protective layer 28 is positioned over the positive electrode current collector exposed surface 21a and both end portions of the protective layer 28 is positioned over the positive electrode mixture layer 21B. A part of the center of the protective layer 28 is interposed between the bottom portion of the lead 25 and the positive electrode current collector exposed surface 21a such that a part of the protective layer 28 is interposed between a part of the bottom edge and both side edges of the lead 25 and the positive electrode current collector exposed surface 21a.

(Other Second Structural Example of Protective Layer)

Figure 6:
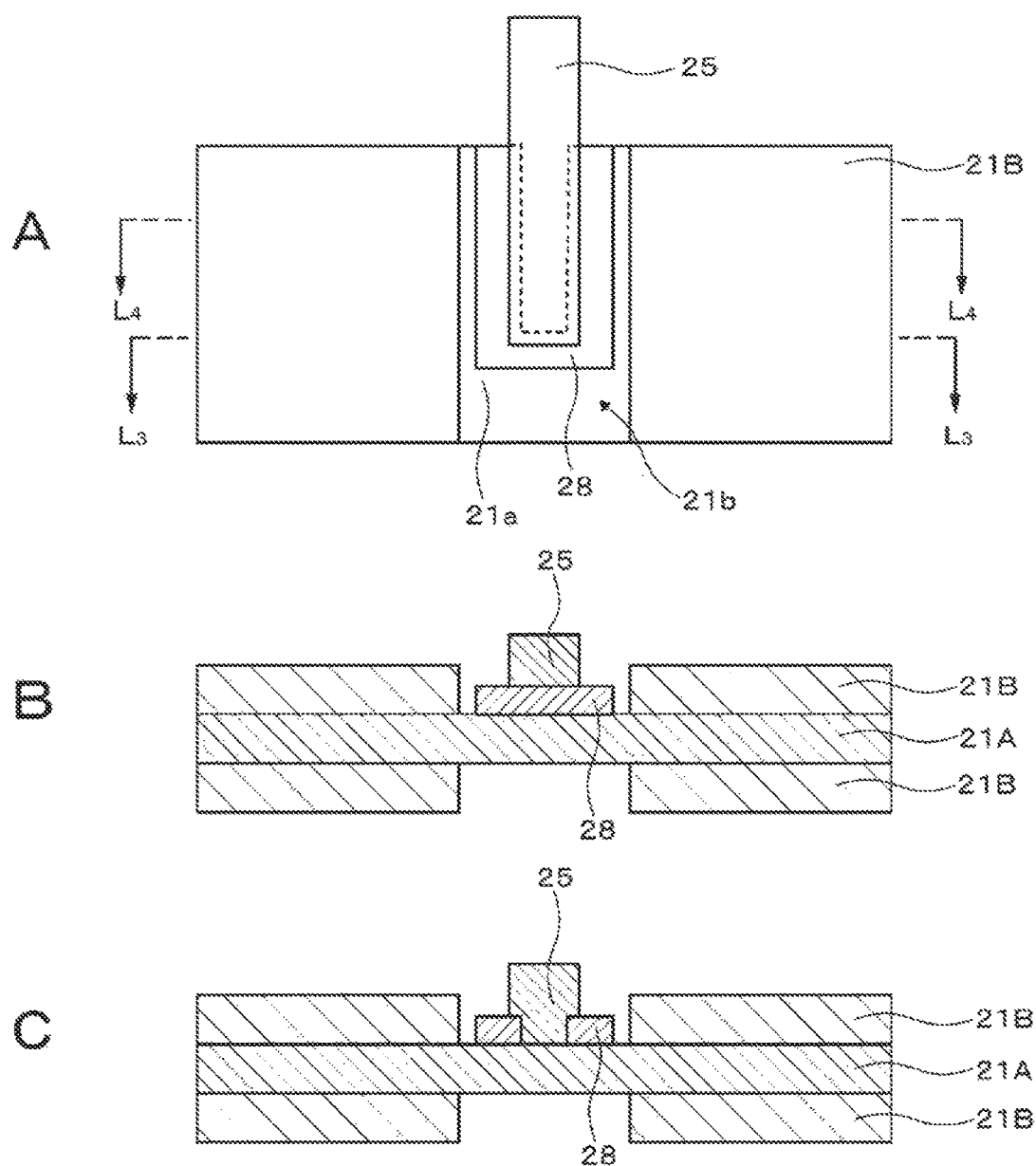
FIG. 6A is a top view of the region Q in FIG. 3 in a case where a protective layer is formed according to other second structural example.
FIG. 6B is a cross-sectional view along a line $L_3$-$L_3$ in FIG. 6A.
FIG. 6C is a cross-sectional view along a line $L_4$-$L_4$ in FIG. 6A.

The other second structural example of the protective layer will be described with reference to FIGS. 6A to 6C. FIG. 6A is a top view of the region Q in FIG. 3 in a case where the protective layer is formed according to the other second structural example. FIG. 6B is a cross-sectional view along a line $L_3$-$L_3$ in FIG. 6A. FIG. 6C is a cross-sectional view along a line $L_4$-$L_4$ in FIG. 6A. Note that in FIGS. 6A to 6C, illustration of the protective tape 27 is omitted.

As shown in FIGS. 6A to 6C, the protective layer 28 having a squared U plane shape is formed in the both-surface non-coated portion 21b. A part of the protective layer 28 is interposed between a part of the bottom portion and both side portions of the lead 25 and the positive electrode current collector exposed surface 21a such that the part of the positive electrode layer 28 is interposed between a part of the bottom edge and the both side edges of the lead 25 and the positive electrode current collector exposed surface 21a. In this second structural example, the protective layer 28 is interposed between the positive electrode current collector exposed surface 21a and each of the entire portion where both the side edges of the lead 25 overlap with the positive electrode current collector exposed surface 21a in the thickness direction and the bottom edge of the lead 25.

(Other Third Structural Example of Protective Layer)

Figure 7:
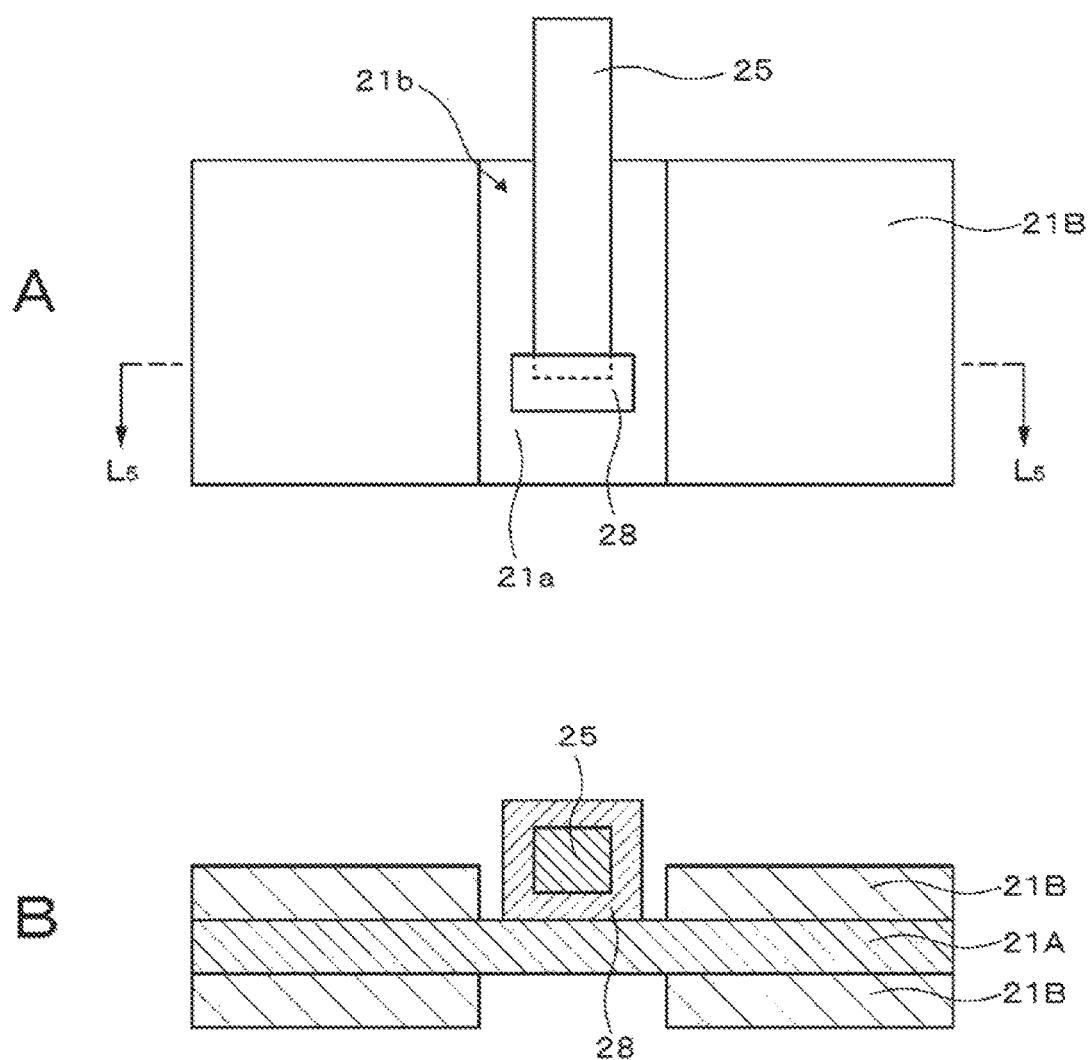
FIG. 7A is a top view of the region Q in FIG. 3 in a case where a protective layer is formed according to other third structural example.
FIG. 7B is a cross-sectional view along line a $L_5$-$L_5$ in FIG. 7A.

The other third structural example of the protective layer will be described with reference to FIGS. 7A and 7B. FIG. 7A is a top view of the region Q in FIG. 3 in a case where the protective layer is formed according to the other third structural example. FIG. 7B is a cross-sectional view along a line $L_5$-$L_5$ in FIG. 7A. Note that in FIGS. 7A and 7B, illustration of the protective tape 27 is omitted.

As shown in FIGS. 7A and 7B, the lead 25 and the protective layer 28 are formed in the both-surface non-coated portion 21b. The protective layer 28 is formed so as to cover a top surface, a bottom surface, and both side surfaces of the bottom portion of the lead 25. A part of the center of the protective layer 28 is interposed between the bottom portion of the lead 25 and the positive electrode current collector exposed surface 21a such that a part of the protective layer 28 is interposed between a part of the bottom edge and both the side edges of the lead 25 and the positive electrode current collector exposed surface 21a.

(Positive Electrode Current Collector)

The positive electrode current collector 21A has a foil shape, for example, and is formed using a metal material such as aluminum, nickel, or stainless steel.

The positive electrode current collector 21A preferably has a thickness of greater than or equal to 10 μm and less than or equal to 20 μm. When the thickness of the positive electrode current collector 21A is less than 10 μm, effects of suppressing a damage of foil due to the expansion and shrinkage during cycles are reduced, and when the thickness is greater than 20 μm, the strength of the current collector (e.g., Al foil) can be sufficiently maintained without the protective layer 28, and accordingly, the necessity of formation of the protective layer 28 is decreased.

(Positive Electrode Mixture Layer)

The positive electrode mixture layer 21B contains one or more kinds of the positive electrode material capable of intercalating and deintercalating lithium as a positive electrode active material, and may also contain another material such as a binder or a conductive material as necessary.

Suitable examples of the positive electrode material capable of intercalating and deintercalating lithium include a lithium oxide, a lithium phosphate, a lithium sulfide, and a lithium-containing compound such as an interlayer compound containing lithium, and two kinds or more thereof may be mixed. In order to increase an energy density, a lithium containing compound containing lithium, a transition metal element, and oxygen (O) is preferable. Examples of such a lithium-containing compound include a lithium composite oxide having a layered rock salt structure represented by Chemical Formula (1), a lithium composite phosphate having an olivine structure represented by Chemical Formula (2), and the like. As the lithium-containing compound, one containing, as a transition metal element, at least one selected from the group consisting of cobalt (Co), nickel (Ni), manganese (Mn), and iron (Fe) is preferable. Examples of such a lithium-containing compound include a lithium composite oxide having a layered rock salt structure represented by Chemical Formula (3), Chemical Formula (4), or Chemical Formula (5), a lithium composite oxide having a spinel structure represented by Chemical Formula (6), a lithium composite phosphate having an olivine structure represented by Chemical Formula (7), and the like. Specifically, $LiNi_{x1}Co_{y1}M_{z1}O_2$ (in the formula, M represents at least one of Al and a transition metal (except for Ni and Co); $x_1$ is $0<x_1<1$; $y_1$ is $0<y_1<1$; $z_1$ is $0<z_1<1$; where $x_1+y_1+z_1=1$), $LiNi_{0.50}Co_{0.20}Mn_{0.30}O_2$, $Li_aCoO_2$ ($a\approx1$), $Li_bNO_2$ ($b\approx1$), $Li_{c1}Ni_{c2}Co_{1-c2}O_2$ ($c1\approx1$, $0<c2<1$), $Li_dMn_2O_4$ ($d\approx1$), $Li_eFePO_4$ ($e\approx1$), or the like can be used.

(in the formula, M1 represents at least one of elements selected from 2 to 15 group elements except for nickel (Ni) and manganese (Mn); X represents at least one of 16 and 17 group elements except for oxygen (O); p, q, r, y, and z are values in ranges of $0\leq p\leq1.5$, $0\leq q\leq1.0$, $0\leq r\leq1.0$, $-0.10\leq y\leq0.20$, and $0\leq z\leq0.2$).

(in the formula, M2 represents at least one selected from 2 to 15 group elements; a and b are values in ranges of $0\leq a\leq2.0$ and $0.5\leq b\leq2.0$).

(in the formula, M3 represents at least one selected from the group consisting of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W); f, g, h, j, and k are values in ranges of 0.8≤f≤1.2, 0<g<0.5, 0≤h≤0.5, g+h<1, −0.1≤j≤0.2, and 0≤k≤0.1. Note that the composition of lithium differs depending on the state of charge/discharge, and the value of f represents a value in a complete discharge state).

$$Li_mNi_{(1-n)}M4_nO_{(2-p)}F_q \quad (4)$$

(in the formula, M4 represents at least one selected from the group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); m, n, p, and q are values in ranges of 0.8≤m≤1.2, 0.005≤n≤0.5, −0.1≤p≤0.2, and 0≤q≤0.1. Note that the composition of lithium differs depending on the state of charge/discharge, and the value of m represents a value in a complete discharge state).

$$Li_rCo_{(1-s)}M5_sO_{(2-t)}F_u \quad (5)$$

(in the formula, M5 represents at least one selected from the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); r, s, t, and u are values in ranges of 0.8≤r≤1.2, 0≤s≤0.5, −0.1≤t≤0.2, and 0≤u≤0.1. Note that the composition of lithium differs depending on the state of charge/discharge, and the value of r represents a value in a complete discharge state).

$$Li_vMn_{2-w}M6_wO_xF_y \quad (6)$$

(in the formula, M6 represents at least one selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); v, w, x, and y are values in ranges of 0.9≤v≤1.1, 0≤w≤0.6, 3.7≤x≤4.1, and 0≤y≤0.1. Note that the composition of lithium differs depending on the state of charge/discharge, and the value of v represents a value in a complete discharge state).

$$Li_zM7PO_4 \quad (7)$$

(in the formula, M7 represents at least one selected from the group consisting of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr); z is a value in a range of 0.9≤z≤1.1. Note that the composition of lithium differs depending on the state of charge/discharge, and the value of z represents a value in a complete discharge state).

Other examples of the positive electrode material capable of intercalating and deintercalating lithium include inorganic compounds which do not contain lithium, such as $MnO_2$, $V_2O_5$, $V_6O_{13}$, NiS, and MoS.

The positive electrode material capable of intercalating and deintercalating lithium may be any material other than the above examples. Further, two or more of the above-described examples of the positive electrode material may be mixed in a given combination.

(Binder)

Examples of the binder include synthetic rubbers such as a styrene-butadiene-based rubber, a fluoro-based rubber, or ethylene propylene diene, and polymer materials such as polyvinylidene difluoride. These examples may be used alone or in combination.

(Conductive Material)

Examples of the conductive material include carbon materials such as graphite and carbon black. These examples may be used alone or in combination. Note that the conductive material may be a metal material, a conductive polymer, or the like as long as it is a material having conductivity.

(Thickness of Positive Electrode Mixture Layer and Thickness of Lead)

In both the main surfaces of the positive electrode current collector 21A, the positive electrode mixture layer 21B formed over the main surface over which the lead 25 is to be formed preferably has a less thickness than the lead 25. When the thickness of the positive electrode mixture layer 21B is greater than the thickness of the lead 25, the great thickness of the positive electrode mixture layer 21B makes it difficult for the lead 25 to be pressed in the electrode body at the time of the expansion and shrinkage due to charge/discharge cycles. Therefore, the necessity of provision of the protective layer 28 for suppressing a foil cut is decreased. Note that the thickness of the positive electrode mixture layer 21B is a thickness on one surface.

(Negative Electrode)

For example, the negative electrode 22 is formed by providing a negative electrode mixture layer 22B on both surfaces of the negative electrode current collector 22A having a pair of surfaces. Note that the negative electrode 22 may include a region where the negative electrode mixture layer 22B is provided on only one surface of the negative electrode current collector 22A.

The negative electrode current collector 22A has a foil shape, for example, and is formed using a metal material such as copper, nickel, or stainless steel.

The negative electrode mixture layer 22B contains one or more kinds of the negative electrode material capable of intercalating and deintercalating lithium as a negative electrode active material, and may also contain another material such as a binder or a conductive material as necessary.

In this negative electrode mixture layer 22B, for example, in order to prevent unintended precipitation of a lithium metal at the time of charge/discharge, the capacity of the negative electrode material which can be charged is preferably larger than the discharge capacity of the positive electrode 21. Note that the same binder and conductive material described in the description of the positive electrode can be used.

Examples of the negative electrode material capable of intercalating and deintercalating lithium include carbon materials. Examples of the carbon materials include non-graphitizable carbon, graphitizable carbon, synthetic graphite such as MCMB (meso-carbon microbeads), natural graphite, pyrocarbons, cokes, graphites, glassy carbons, an organic polymer compound burned substance, carbonblacks, carbon fiber, and activated carbon. Among these, the cokes include pitch coke, needle coke, petroleum coke, and the like. The organic polymer compound burned substance refers to a carbonized material obtained by baking a polymer material such as a phenol resin or a furan resin at an appropriate temperature, and some of such carbonized materials are classified into non-graphitizable carbon or graphitizable carbon.

Besides the above-described carbon materials, examples of the negative electrode material capable of intercalating and deintercalating lithium further include a material capable of intercalating and deintercalating lithium and containing at least one kind of metal elements and semi-metal elements as a constituent element. This is because a high energy density can be obtained with use of such a material. Such a negative electrode active material may be a simple substance, an alloy, or a compound of the metal element or the semi-metal element, or may contain, at least partly, a phase of one or more of the simple substance, alloy, or compound of the metal element or the semi-metal element. Note that in the present application, the alloy includes a material formed with two or more kinds of metal elements and a material containing one or more kinds of metal elements and one or more kinds of semi-metal elements. Further, the alloy may contain a non-metal element. Examples of its texture include a solid solution, a eutectic (eutectic mixture), an intermetallic compound, and one in which two or more kinds thereof coexist.

Examples of the metal element or semi-metal element include a metal element or a semi-metal element capable of forming an alloy together with lithium. Specifically, such examples include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). In particular, at least one of silicon and tin is preferable, and silicon is more preferable. This is because a high capability of intercalating and deintercalating lithium leads to a high energy density.

Examples of the negative electrode material containing at least one of silicon and tin include a simple substance, an alloy, or a compound of silicon, a simple substance, an alloy, or a compound of tin, and a material containing, at least partly, a phase of one or more kinds thereof.

Examples of the alloy of silicon include alloys containing, as a second constituent element other than silicon, at least one selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). Examples of the alloy of tin include alloys containing, as a second constituent element other than tin (Sn), at least one selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

Examples of the compound of tin or the compound of silicon include compounds containing oxygen (O) or carbon (C), which may contain any of the above-described second constituent elements in addition to tin (Sn) or silicon (Si).

In particular, it is preferable to use, as the negative electrode material containing at least one of silicon (Si) and tin (Sn), for example, a material containing tin (Sn) as a first constituent element and a second constituent element and a third constituent element in addition to tin (Sn). It is needless to say that this negative electrode material may be used together with any of the above-described negative electrode materials. The second constituent element is at least one selected from the group consisting of cobalt (Co), iron (Fe), magnesium (Mg), titanium (Ti), vanadium (V), chromium (Cr), manganese (Mn), nickel (Ni), copper (Cu), zinc (Zn), gallium (Ga), zirconium (Zr), niobium (Nb), molybdenum (Mo), silver (Ag), indium (In), cerium (Ce), hafnium (Hf), tantalum (Ta), tungsten (W), bismuth (Bi), and silicon (Si). The third constituent element is at least one selected from the group consisting of boron (B), carbon (C), aluminum (Al), and phosphorus (P). This is because the cycling characteristics are improved by containing the second and third constituent elements.

Among them, an SnCoC-containing material is preferable which contains tin (Sn), cobalt (Co), and carbon (C) as constituent elements, the content of carbon (C) is higher than or equal to 9.9 mass % and lower than or equal to 29.7 mass %, and the ratio of cobalt (Co) in the total of tin (Sn) and cobalt (Co) (Co/(Sn+Co)) is higher than or equal to 30 mass % and lower than or equal to 70 mass %. This is because the high energy density and excellent cycling characteristics can be obtained in these composition ranges.

The SnCoC-containing material may also contain another constituent element as necessary. For example, it is preferable to contain, as the other constituent element, silicon (Si), iron (Fe), nickel (Ni), chromium (Cr), indium (In), niobium (Nb), germanium (Ge), titanium (Ti), molybdenum (Mo), aluminum (Al), phosphorous (P), gallium (Ga), or bismuth (Bi), and two or more kinds of these elements may be contained. This is because the capacity characteristics or cycling characteristics can be further increased.

Note that the SnCoC-containing material has a phase containing tin (Sn), cobalt (Co), and carbon (C), and this phase preferably has a low crystalline structure or an amorphous structure. Further, in the SnCoC-containing material, at least a part of carbon (C), which is a constituent element, is preferably bound to a metal element or a semi-metal element that is another constituent element. This is because, when carbon is bound to another element, aggregation or crystallization of tin (Sn) or the like, which is considered to cause a decrease in cycling characteristics, can be suppressed.

Examples of a measurement method for examining the binding state of elements include X-ray photoelectron spectroscopy (XPS). In the XPS, so far as graphite is concerned, a peak of the 1s orbit (C1s) of carbon appears at 284.5 eV in an energy-calibrated apparatus such that a peak of the 4f orbit (Au4f) of a gold atom is obtained at 84.0 eV. Also, so far as surface contamination carbon is concerned, a peak of the 1s orbit (C1s) of carbon appears at 284.8 eV. On the contrary, when a charge density of the carbon element is high, for example, when carbon is bound to a metal element or a semi-metal element, the peak of C1s appears in a region lower than 284.5 eV. That is, when a peak of a combined wave of C1s obtained regarding the SnCoC-containing material appears in a region lower than 284.5 eV, at least a part of carbon (C) contained in the SnCoC-containing material is bound to a metal element or a semi-metal element, which is another constituent element.

In the XPS measurement, for example, the peak of C1s is used for correcting the energy axis of a spectrum. In general, since surface contamination carbon exists on the surface, the peak of C1s of the surface contamination carbon is fixed at 284.8 eV, and this peak is used as an energy reference. In the XPS measurement, since a waveform of the peak of C1s is obtained as a form including the peak of the surface contamination carbon and the peak of carbon in the SnCoC-containing material, the peak of the surface contamination carbon and the peak of the carbon in the SnCoC-containing material are separated from each other by means of analysis using, for example, a commercially available software program. In the analysis of the waveform, the position of a main peak existing on the lowest binding energy side is used as an energy reference (284.8 eV).

Examples of the negative electrode material capable of intercalating and deintercalating lithium include a metal oxide, a polymer compound, and the like capable of intercalating and deintercalating lithium. Examples of the metal oxide include lithium titanate ($Li_4Ti_5O_{12}$), iron oxide, ruthenium oxide, molybdenum oxide, and the like, and examples of the polymer compound include polyacetylene, polyaniline, polypyrrole, and the like.

Note that the negative electrode material capable of intercalating and deintercalating lithium may be any other material than the above examples. Further, two kinds or more of the above-described negative electrode materials may be mixed in a given combination.

The negative electrode mixture layer 22B may be, for example, formed by any of a vapor phase method, a liquid phase method, a spraying method, a baking method, or an applying method, or two or more of these methods may be combined. When the negative electrode mixture layer 22B is formed by adopting a vapor phase method, a liquid phase method, a spraying method, a baking method or by combining two or more of these methods, it is preferable that the negative electrode mixture layer 22B and the negative electrode current collector 22A are alloyed on at least a part of an interface therebetween. Specifically, it is preferable that, on the interface, constituent elements of the negative electrode current collector 22A are diffused into the negative electrode mixture layer 22B, constituent elements of the negative electrode mixture layer 22B are diffused into the negative electrode current collector 22A, or these constituent elements are mutually diffused into each other. This is because not only breakage to be caused by the expansion and shrinkage of the negative electrode mixture layer 22B due to the charge/discharge can be suppressed, but also electron conductivity between the negative electrode mixture layer 22B and the negative electrode current collector 22A can be enhanced.

Examples of the vapor phase method include a physical deposition method and a chemical deposition method, specifically a vacuum evaporation method, a sputtering method, an ion plating method, a laser abrasion method, a thermal chemical vapor deposition (CVD) method, a plasma chemical vapor deposition method, and the like. As the liquid phase method, known techniques such as electroplating and electroless plating can be adopted. The baking method refers to, for example, a method in which after a particulate negative electrode active material is mixed with a binder and the like, the mixture is dispersed in a solvent and applied, and the applied material is then heat treated at a temperature higher than a melting point of the binder or the like. As for the baking method, known techniques can also be used, and examples thereof include an atmospheric baking method, a reaction baking method, and a hot press baking method.

(Volume Density of Negative Electrode Mixture Layer)

The volume density of the negative electrode mixture layer 22B is preferably higher than or equal to 1.40 g/cm$^3$ and lower than or equal to 1.75 g/cm$^3$. When the volume density of the negative electrode mixture layer 22B is lower than 1.40 g/cm$^3$, the degree of the expansion and shrinkage during cycles is decreased, so that in the both-surface non-coated portion 22b, a foil cut of the current collector is unlikely to be generated and the necessity of formation of the protective layer 28 is decreased. When the volume density of the negative electrode mixture layer 22B is higher than 1.75 g/cm$^3$, spaces in the negative electrode are reduced and battery characteristics are decreased. Note that after cell composition, charging the cell to 2.5 V, discharging the cell, decomposition of the cell, and then soaking in a solvent such as dimethyl carbonate (DMC) for a predetermined time (e.g., 30 minutes), the volume density of the negative electrode mixture layer 22B is measured, for example.

(Separator)

The separator 23 allows lithium ions to pass therethrough while separating the positive electrode 21 and the negative electrode 22 from each other and preventing a short circuit of current due to contact between these electrodes. This separator 23 is formed of, for example, a porous film of synthetic resin such as polytetrafluoroethylene, polypropylene, or polyethylene, a porous film of ceramics, or the like, and two kinds or more of these porous films may be laminated. This separator 23 is impregnated with an electrolyte solution, which is a liquid electrolyte.

(Electrolyte Solution)

The electrolyte solution is obtained by dissolving an electrolyte salt in a non-aqueous solvent and exhibits ion conductivity by ionization of the electrolyte salt. The electrolyte solution is impregnated into the separator 23. As the electrolyte solution, without any particular limitation, an existing non-aqueous electrolyte solution or the like can be used.

(Electrolyte Salt)

Examples of the electrolyte salt include lithium hexafluorophosphate (LiPF$_6$), lithium bis(pentafluoroethanesulfonyl)imide (Li(C$_2$F$_5$SO$_2$)$_2$N), lithium perchlorate (LiClO$_4$), lithium hexafluoroarsenate (LiAsF$_6$), lithium tetrafluoroborate (LiBF$_4$), lithium trifluoromethanesulfonate (LiSO$_3$CF$_3$), lithium bis(trifluoromethanesulphonyl)imide (Li(CF$_3$SO$_2$)$_2$N), tris(trifluoromethanesulfonyl)methyllithium (LiC(SO$_2$CF$_3$)$_3$)$_3$), lithium chloride (LiCl), lithium bromide (LiBr), LiB(C$_6$H$_5$)$_4$, LiCH$_3$SO$_3$, LiCF$_3$SO$_3$, LiN(SO$_2$CF$_3$)$_2$, LiAlCl$_4$, LiSiF$_6$, difluoro [oxalato-O,O']lithium borate, lithium bis-oxalate borate, and the like. In particular, LiPF$_6$ is particularly preferable because high ion conductivity can be obtained and cycling characteristics can be improved. As the electrolyte salt, any one kind selected from the above examples may be used alone or plural kinds may be mixed.

(Non-Aqueous Solvent)

Examples of the non-aqueous solvent in which the electrolyte salt is dissolved include an ordinary temperature molten salt such as ethylene carbonate, propylene carbonate, butylene carbonate, vinylene carbonate, dimethyl carbonate, diethyl carbonate, ethyl methyl carbonate, 4-fluoro-1,3-dioxolan-2-one, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, ethyl propionate, acetonitrile, glutaronitrle, adiponitrile, methoxyacetonitrile, 3-methoxypropionitrile, N,N-dimethylformamide, N-methylpyrrolidone, N-methyloxazolidinone, nitromethane, nitroethane, sulfolane, dimethyl sulfoxide, trimethyl phosphate, triethyl phosphate, ethylene sulfite, bis(trifluoromethylsulfonyl)imide, or trimethyl hexyl ammonium. In particular, ethylene carbonate, propylene carbonate, vinylene carbonate, 4-fluoro-1,3-dioxolan-2-one, dimethyl carbonate, ethyl methyl carbonate, or ethylene sulfite are preferable because excellent charge/discharge capacity characteristics and charge/discharge cycling characteristics can be obtained. As the solvent, it is possible to use any of the above examples alone or two or more examples mixed.

(Manufacturing Method of Battery)

This non-aqueous electrolyte battery is manufactured by the following manufacturing method for example.

(Manufacture of Positive Electrode)

First, the positive electrode 21 is manufactured. First of all, a positive electrode mixture is obtained by mixing a positive electrode active material, a binder, and a conductive material, and a paste-form positive electrode slurry is obtained by dispersing this positive electrode mixture in an organic solvent. Next, the positive electrode mixture slurry is applied uniformly on a predetermined region on both main surfaces of the positive electrode current collector 21A with a doctor blade, a bar coater, or the like, and is dried. Finally, the applied film is compression molded with a rolling press machine or the like while being heated as necessary, so that the positive electrode mixture layer 21B is formed. In this case, the compression molding may be repeated plural times.

(Manufacture of Negative Electrode)

Then, the negative electrode 22 is manufactured. First of all, a negative electrode mixture is obtained by mixing a negative electrode material, a binder, and a conductive material as necessary, and a paste-form negative electrode slurry is obtained by dispersing this negative electrode mixture in an organic solvent. Next, the negative electrode mixture slurry is applied uniformly on a predetermined region on both main surfaces of the negative electrode current collector 22A with a doctor blade, a bar coater, or the like, and is dried. Finally, the applied film is compression molded with a rolling press machine or the like while being heated as necessary, so that the negative electrode mixture layer 22B is formed.

Note that the negative electrode 22 may be manufactured as follows. First of all, the negative electrode current collector 22A formed of electrolytic copper foil or the like is prepared, and then the negative electrode material is deposited on both surfaces of the negative electrode current collector 22A by a vapor phase method such as an evaporation method, so that a plurality of negative electrode active material particles are formed. After that, an oxide-containing film is formed by a liquid phase method such as a liquid phase deposition method, a metal material is formed by a liquid phase method such as an electroplating method, or both the oxide-containing film and the metal material are formed, as necessary, so that the negative electrode mixture layer 22B is formed.

(Composition of Battery)

The composition of the non-aqueous electrolyte battery is performed in the following manner. First, the lead 25 is attached to the positive electrode current collector 21A by welding or the like, and the lead 26 is attached to the negative electrode current collector 22A by welding or the like. Further, the protective tape 27 and the protective layer 28 are provided at predetermined positions.

Subsequently, the positive electrode 21 and the negative electrode 22 are laminated and wound with the separator 23 interposed therebetween to form the wound electrode body 20. After that, the center pin 24 is inserted to the winding center. Next, the wound electrode body 20 is interposed between the pair of insulating plates 12 and 13 and is housed in the inside of the battery can 11, and a tip end of the lead 25 is welded to the safety valve mechanism 15 and a tip end of the lead 26 is welded to the battery can 11.

Then, the above-described electrolyte solution is injected into the inside of the battery can 11 and impregnated into the separator 23. Finally, the battery cap 14, the safety valve mechanism 15, and the positive temperature coefficient element 16 are fixed to the open end portion of the battery can 11 by caulking via the gasket 17. In this manner, the non-aqueous electrolyte battery is completed.

2. Second Embodiment (Example of Battery Pack)

Figure 8:
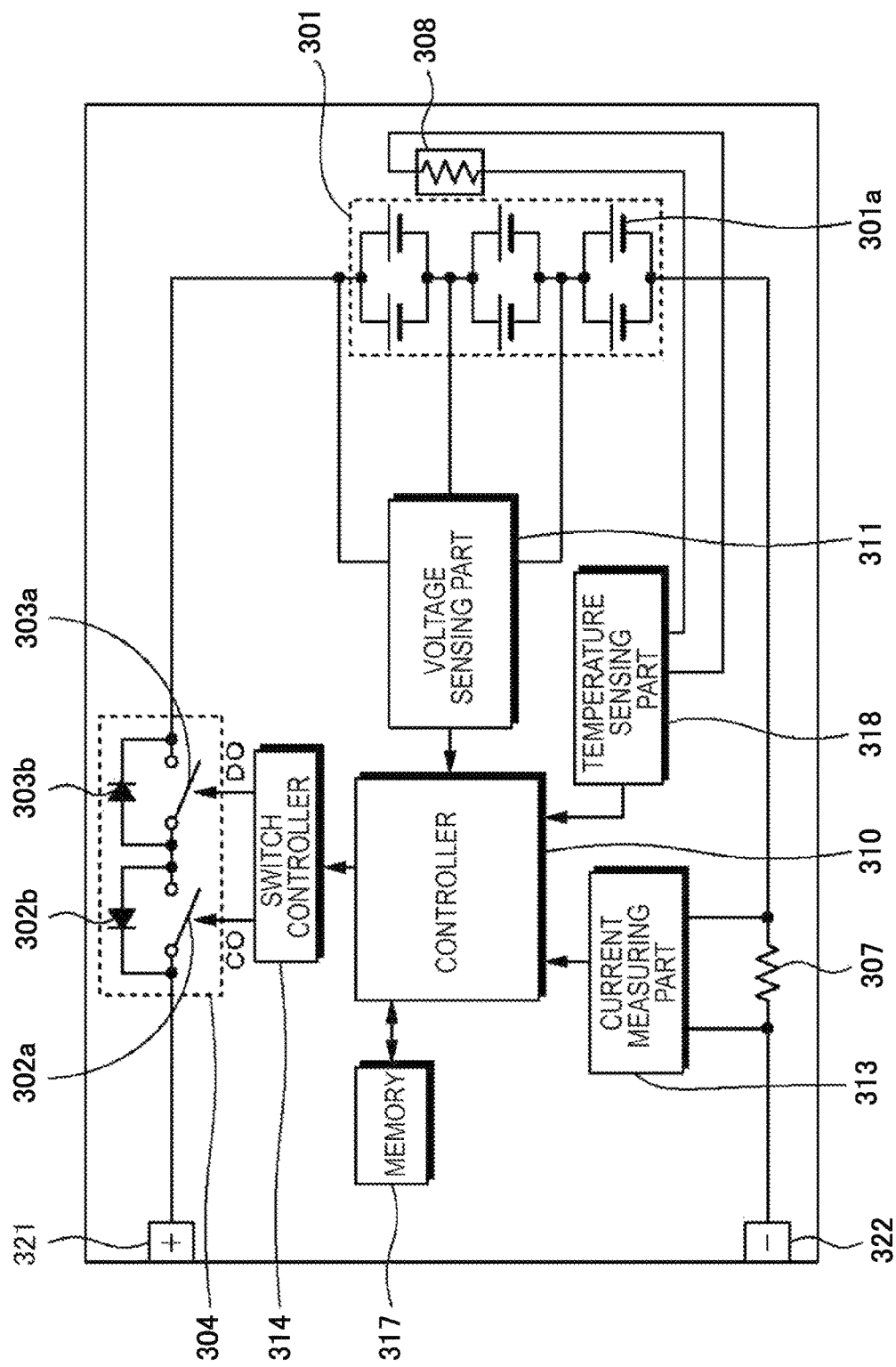
FIG. 8 is a block diagram showing a configuration example of a battery pack according to an embodiment of the present application.

FIG. 8 is a block diagram showing a circuit configuration example in a case where the non-aqueous electrolyte battery according to an embodiment of the present application (hereinafter referred to as secondary battery as appropriate) is used in a battery pack. The battery pack includes an assembled battery 301, a package, a switch part 304 including a charge control switch 302a and a discharge control switch 303a, a current sensing resistor 307, a temperature sensing element 308, and a controller 310.

Further, the battery pack includes a positive electrode terminal 321 and a negative electrode terminal 322, and at the time of charge, the positive electrode terminal 321 and the negative electrode terminal 322 are connected to a positive electrode terminal and a negative electrode terminal of a battery charger, respectively, and charge is performed. Further, at the time of using an electronic device, the positive electrode terminal 321 and the negative electrode terminal 322 are connected to a positive electrode terminal and a negative electrode terminal of the electronic device, respectively, and discharge is performed.

The assembled battery 301 is formed by connecting a plurality of secondary batteries 301a in series and/or in parallel. Each of the secondary batteries 301a is the secondary battery according to an embodiment of the present application. Note that although FIG. 8 shows an example in which six secondary batteries 301a are connected so as to have two parallel connections and three series connections (2P3S), any other connection can be adopted such as n parallel and m series (n and m are integers) connections.

The switch part 304 includes the charge control switch 302a, a diode 302b, the discharge control switch 303a, and a diode 303b, and is controlled by the controller 310. The diode 302b has a polarity that is reverse to charge current flowing in the direction from the positive electrode terminal 321 to the assembled battery 301 and forward to discharge current flowing in the direction from the negative electrode terminal 322 to the assembled battery 301. The diode 303b has a polarity that is forward to the charge current and reverse to the discharge current. Note that although an example is shown in which the switch part is provided on a plus side, the switch part may be provided on a minus side.

The charge control switch 302a is turned off when the battery voltage is an overcharge detection voltage and is controlled by the controller 310 so that charge current does not flow into a current path of the assembled battery 301. After the charge control switch 302a is turned off, only discharge is possible via the diode 302b. Further, when overcurrent flows during charge, the charge control switch 302a is turned off and controlled by the controller 310 so that charge current flowing in the current path of the assembled battery 301 is cut off.

The discharge control switch 303a is turned off when the battery voltage is an overdischarge detection voltage and is controlled by the controller 310 so that discharge current does not flow into the current path of the assembled battery 301. After the discharge control switch 303a is turned off, only charge is possible via the diode 303b. Further, when overcurrent flows during discharge, the discharge control switch 303a is turned off and controlled by the controller 310 so that discharge current flowing in the current path of the assembled battery 301 is cut off.

The temperature sensing element 308 is a thermistor for example, and is provided near the assembled battery 301, measures the temperature of the assembled battery 301, and supplies the measured temperature to the controller 310. A voltage sensing part 311 measures the voltage of the assembled battery 301 and of each secondary battery 301a forming the assembled battery 301, A/D converts the measured voltage, and supplies the voltage to the controller 310. A current measuring part 313 measures current with the current sensing resistor 307, and supplies the measured current to the controller 310.

A switch controller 314 controls the charge control switch 302a and the discharge control switch 303a of the switch part 304, based on the voltage and current input from the voltage sensing part 311 and the current measuring part 313. When the voltage of any of the secondary batteries 301a is the overcharge detection voltage or lower or the overdischarge detection voltage or lower, or when overcurrent flows rapidly, the switch controller 314 transmits a control signal to the switch part 304 to prevent overcharge, overdischarge, and overcurrent charge/discharge.

Here, in a case where the secondary battery is a lithium ion secondary battery for example, the overcharge detection voltage is set to 4.20 V±0.05 V for example, and the overdischarge detection voltage is set to 2.4 V±0.1 V for example.

As a charge/discharge switch, for example, a semiconductor switch such as a MOSFET can be used. In this case, a parasitic diode of the MOSFET serves as the diodes 302b and 303b. In a case where a p-channel FET is used as the charge/discharge switch, the switch controller 314 supplies a control signal DO and a control signal CO to a gate of the charge control switch 302a and a gate of the discharge control switch 303a, respectively. In the case of the p-channel type, the charge control switch 302a and the discharge control switch 303a are turned on at a gate potential which is lower than a source potential by a predetermined value or more. That is, in normal charge and discharge operations, the charge control switch 302a and the discharge control switch 303a are made to be in an ON state by setting the control signals CO and DO to low levels.

Further, when performing overcharge or overdischarge, for example, the charge control switch 302a and the discharge control switch 303a are made to be in an OFF state by setting the control signals CO and DO to high levels.

A memory 317 is formed of a RAM or ROM, and is formed of an erasable programmable read only memory (EPROM), which is a volatile memory, for example. The memory 317 stores, in advance, the value calculated in the controller 310, the internal resistance value of the battery in an initial state of each of the secondary batteries 301a measured at a stage in a manufacturing process, and the like, which are rewritable as necessary. Further, by storing a full charge capacity of the secondary battery 301a, the memory 317 can calculate the remaining capacity together with the controller 310, for example.

A temperature sensing part 318 measures the temperature with use of the temperature sensing element 308, controls charge/discharge at the time of abnormal heat generation, and corrects the calculation of the remaining capacity.

3. Third Embodiment

The above-described non-aqueous electrolyte battery, and a battery pack, a battery unit, and a battery module each using the above-described non-aqueous electrolyte battery can be incorporated in a device such as an electronic device, an electric vehicle, or a power storage device, for example, or can be used for supplying power thereto.

Examples of the electronic device include a laptop personal computer, a PDA (mobile information device), a mobile phone, a cordless extension, a video movie, a digital still camera, an e-book reader, an electronic dictionary, a music player, a radio, a headphone, a game machine, a navigation system, a memory card, a pacemaker, a hearing aid, an electric tool, an electric razor, a refrigerator, an air conditioner, a television set, a stereo, a water heater, a microwave, a dishwasher, a washer, a drier, a lighting device, a toy, a medical device, a robot, a road conditioner, a traffic light, and the like.

Further, examples of the electric vehicle include a railway train, a golf cart, an electric cart, an electric car (including a hybrid car), and the like. The above-described non-aqueous electrolyte battery, and a battery pack, a battery unit, and a battery module each using the above-described non-aqueous electrolyte battery can be used as a power source for driving these vehicles or as a supplementary power source.

Examples of the power storage device include a power source for power storage for buildings such as houses or for power generation equipment, and the like.

From the above application examples, the following will show a specific example of a power storage system using a power storage device using the non-aqueous electrolyte battery according to an embodiment of the present application.

This power storage system can have the following structure for example. A first power storage system is a power storage system in which a power storage device is charged with a power generation device which generates power from renewable energy. A second power storage system is a power storage system which includes the power storage device and supplies power to an electronic device connected to the power storage device. A third power storage system is an electronic device which is supplied with power from the power storage device. These power storage systems are each implemented as a system to supply power efficiently in association with an external power supply network.

Further, a fourth power storage system is an electric vehicle including a conversion device which converts power supplied from the power storage device to driving power of a vehicle, and a control device which performs information processing about vehicle control based on information about the power storage device. A fifth power storage system is a power system including a power information transmitting/receiving part which transmits/receives signals to/from other devices via a network, and controls charge/discharge of the power storage device based on information received by the transmitting/receiving part. A sixth power storage system is a power system which enables power supply from the power storage device and power supply to the power storage device from a power generation device or a power network. The following will show the power storage system.

(3-1) Home Power Storage System as Application Example

Figure 9:
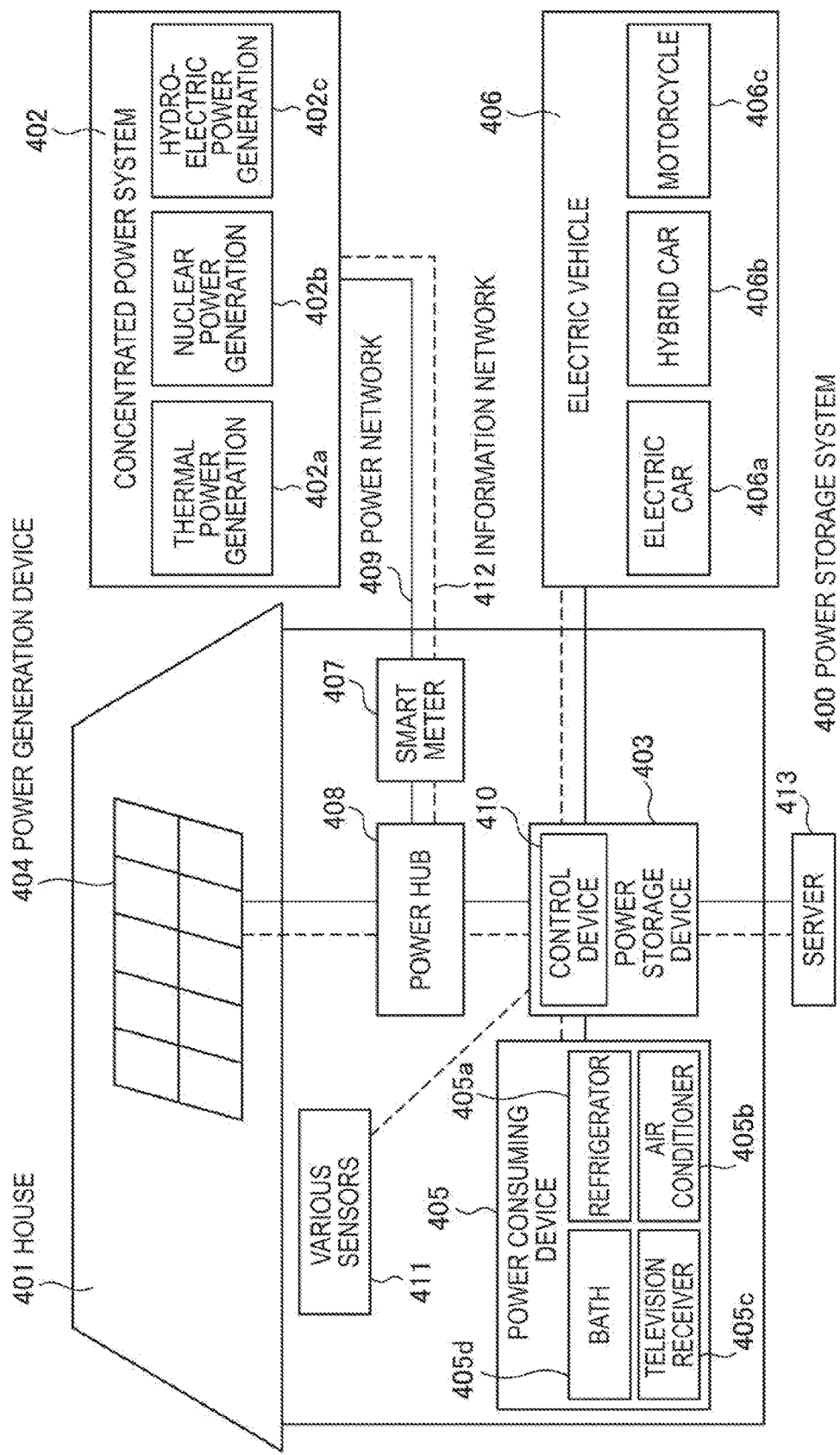
FIG. 9 is a schematic view showing an example of a home power storage system using the non-aqueous electrolyte battery according to an embodiment of the present application.

An example in which the power storage device using the non-aqueous electrolyte battery according to an embodiment of the present application is used for a home power storage system will be described with reference to FIG. 9. For example, in a power storage system 400 for a house 401, power is supplied to the power storage device 403 from a concentrated power system 402 including thermal power generation 402a, nuclear power generation 402b, hydroelectric power generation 402c, and the like, via a power network 409, an information network 412, a smart meter 407, a power hub 408, and the like. Further, power is supplied to the power storage device 403 from an independent power source such as a home power generation device 404. Power supplied to the power storage device 403 is stored, and power to be used in the house 401 is fed with use of the power storage device 403. The same power storage system can be used not only in the house 401 but also in a building.

The house 401 is provided with a power generation device 404, a power consumption device 405, a power storage device 403, a control device 410 which controls each device, the smart meter 407, and sensors 411 which acquires various pieces of information. The devices are connected to each other by the power network 409 and the information network 412. As the power generation device 404, a solar cell, a fuel cell, or the like is used, and generated power is supplied to the power consumption device 405 and/or the power storage device 403. Examples of the power consumption device 405 include a refrigerator 405a, an air conditioner 405b, a television receiver 405c, a bath 405d, and the like. Examples of the power consumption device 405 further include an electric vehicle 406 such as an electric car 406a, a hybrid car 406b, or a motorcycle 406c.

For the power storage device 403, the non-aqueous electrolyte battery according to an embodiment of the present application is used. The non-aqueous electrolyte battery according to an embodiment of the present application may be formed of the above-described lithium ion secondary battery for example. Functions of the smart meter 407 include measuring the used amount of commercial power and transmitting the measured used amount to a power company. The power network 409 may be any one or more of DC power supply, AC power supply, and contactless power supply.

Examples of the various sensors 411 include a motion sensor, an illumination sensor, an object detecting sensor, a power consumption sensor, a vibration sensor, a touch sensor, a temperature sensor, an infrared sensor, and the like. Information acquired by the various sensors 411 is transmitted to the control device 410. With the information from the sensors 411, weather conditions, people conditions, and the like are caught, and the power consumption device 405 is automatically controlled so as to make the energy consumption minimum. Further, the control device 410 can transmit information about the house 401 to an external power company via the Internet, for example.

The power hub 408 performs processes such as branching off power lines and DC/AC conversion. Examples of communication schemes of the information network 412 connected to the control device 410 include a method using a communication interface such as UART (Universal Asynchronous Receiver/Transceiver), and a method using a sensor network according to a wireless communication standard such as Bluetooth, ZigBee, or Wi-Fi. A Bluetooth scheme can be used for multimedia communication, and one-to-many connection communication can be performed. ZigBee uses a physical layer of IEEE (Institute of Electrical and Electronics Engineers) 802.15.4. IEEE802.15.4 is the name of a near-field wireless network standard called PAN (Personal Area Network) or W (Wireless) PAN.

The control device 410 is connected to an external server 413. The server 413 may be managed by any of the house 401, an electric company, and a service provider. Examples of information transmitted and received by the server 413 include power consumption information, life pattern information, electric fee, weather information, natural disaster information, and information about power trade. Such information may be transmitted and received by the power consumption device (e.g., the television receiver) in the house, or may be transmitted and received by a device (e.g., a mobile phone) outside the house. Further, such information may be displayed on a device having a display function, such as the television receiver, the mobile phone, or the PDA (Personal Digital Assistant).

The control device 410 controlling each part is configured with a CPU (Central Processing Unit), a RAM (Random Access Memory), a ROM (Read Only Memory), and the like, and is stored in the power storage device 403 in this example. The control device 410 is connected to the power storage device 403, the home power generation device 404, the power consumption device 405, the various sensors 411, and the server 413 via the information network 412, and has a function of adjusting the used amount of commercial power and the power generation amount, for example. Note that the control device 410 may further have a function of performing power trade in the power market.

As described above, power generated by not only the concentrated power system 402 such as the thermal power generation 402a, the nuclear power generation 402b, and the hydroelectric power generation 402c, but also the home power generation device 404 (solar power generation or wind power generation) can be stored in the power storage device 403. Therefore, even when the power generated by the home power generation device 404 varies, the amount of power supplied to the outside can be constant, or only necessary discharge can be controlled. For example, power generated by the solar power generation can be stored in the power storage device 403 and also inexpensive power at midnight can be stored in the power storage device 403 during nighttime, so that power stored in the power storage device 403 can be discharged and used when the power fee is expensive during daytime.

Note that although this example shows the control device 410 housed in the inside of the power storage device 403, the control device 410 may be housed in the inside of the smart meter 407 or configured independently. Further, the power storage system 400 may be used for a plurality of houses in a multiple dwelling house or a plurality of separate houses.

(3-2) Power Storage System in Vehicle as Application Example

Figure 10:
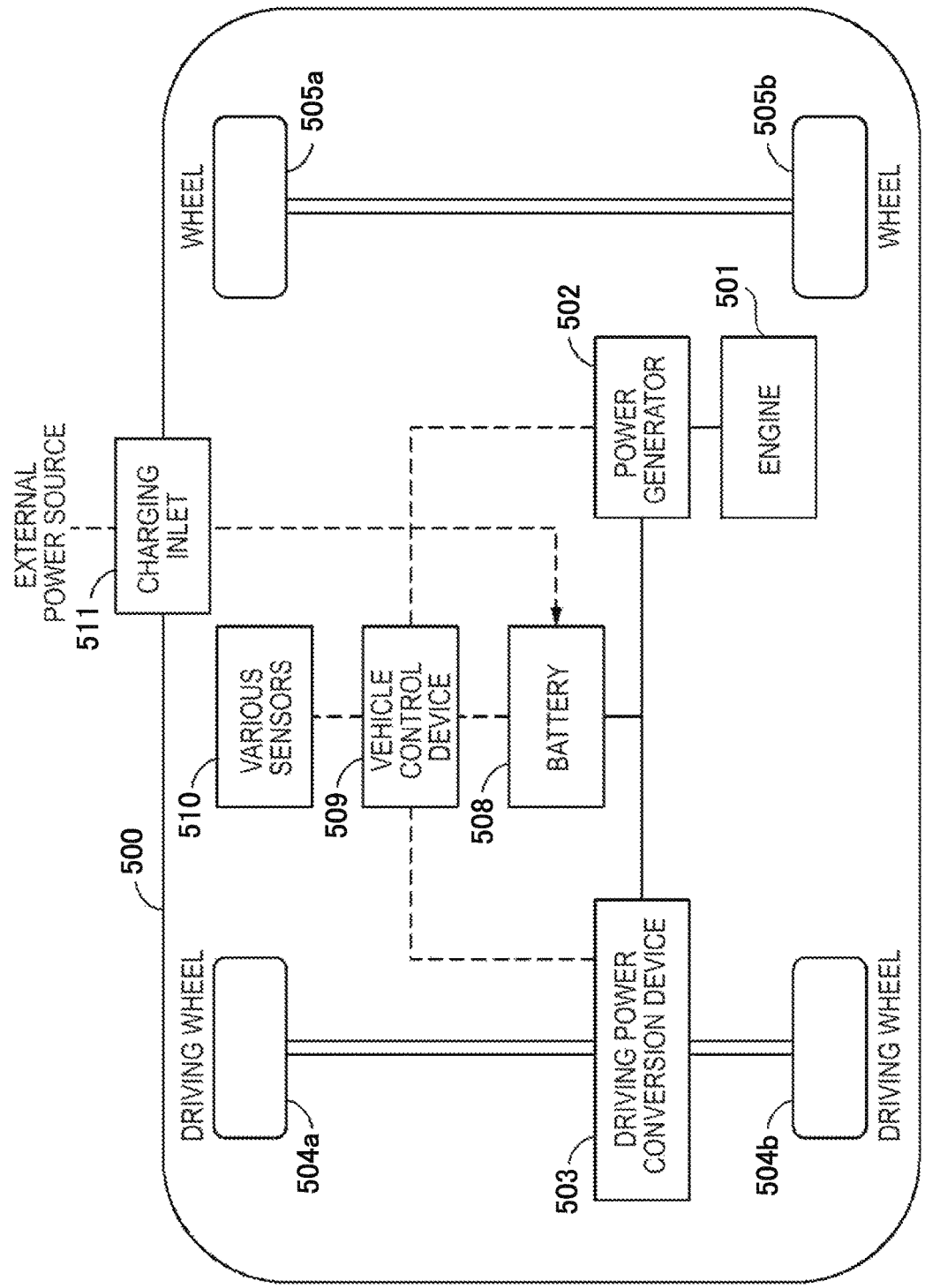
FIG. 10 is a schematic view schematically showing an example of a structure of a hybrid vehicle employing a series hybrid system to which an embodiment of the present application is applied.

An example in which an embodiment of the present application is applied to a power storage system for vehicles will be described with reference to FIG. 10. FIG. 10 schematically shows an example of a structure of a hybrid vehicle employing a series hybrid system to which an embodiment of the present application is applied. The series hybrid system is a car which runs with a driving power conversion device using power generated by a power generator driven by an engine or power obtained by storing the power in a battery.

A hybrid vehicle 500 incorporates an engine 501, a power generator 502, a driving power conversion device 503, driving wheels 504a and 504b, wheels 505a and 505b, a battery 508, a vehicle control device 509, various sensors 510, and a charging inlet 511. For the battery 508, the above-described non-aqueous battery according to an embodiment of the present application is used.

The hybrid vehicle 500 runs by using the driving power conversion device 503 as a power source. One of examples of the driving power conversion device 503 is a motor. Power in the battery 508 drives the driving power conversion device 503, and the rotating power of the driving power conversion device 503 is transmitted to the driving wheels 504a and 504b. Note that by using DC/AC conversion or AC/DC conversion in a necessary portion, an alternate current motor or a direct current motor can be used for the driving power conversion device 503. The various sensors 510 control the number of engine rotation via the vehicle control device 509 and controls the aperture of an unshown throttle valve (throttle aperture). The various sensors 510 include a speed sensor, an acceleration sensor, a sensor of the number of engine rotation, and the like.

The rotating power of the engine 501 is transmitted to the power generator 502, and power generated by the power generator 502 with the rotating power can be stored in the battery 508.

When the hybrid vehicle 500 reduces the speed with an unshown brake mechanism, the resisting power at the time of the speed reduction is added to the driving power conversion device 503 as the rotating power, and regenerative power generated by the driving power conversion device 503 with this rotating power is stored in the battery 508.

The battery 508 can be connected to an external power source of the hybrid vehicle 500, and accordingly, power can be supplied from the external power source by using the charging inlet 511 as an input inlet, and the received power can be stored.

Although not shown, an information processing device which performs information processing about vehicle control based on information about the secondary battery may be provided. Examples of such an information processing device include an information processing device which displays the remaining battery based on information about the remaining battery.

Note that the above description is made by taking an example of the series hybrid car which runs with a motor using power generated by a power generator driven by an engine or power obtained by storing the power in a battery. However, an embodiment of the present application can also be applied effectively to a parallel hybrid car which uses the output of an engine and a motor as the driving power source and switches three modes as appropriate: driving with the engine only; driving with the motor only; and driving with the engine and the motor. Further, an embodiment of the present application can also be applied effectively to a so-called electric vehicle which runs by being driven with a driving motor only, without an engine.

EXAMPLE

In the following, specific examples of the present application will be described in detail; however, the present application is not limited to the following examples.

Example 1

[Fabrication of Positive Electrode]

A positive electrode mixture was prepared by mixing 95 parts of a positive electrode active material, 2.5 parts of graphite, which is a conductive material, and 2.5 parts of polyvinylidene difluoride (PVdF), which is a binder. This positive electrode mixture was dispersed in N-methyl-2-pyrrolidone, which is a solvent, so that a paste-form positive electrode mixture slurry was obtained.

Then, the positive electrode mixture slurry was intermittent-applied uniformly on one surface of a positive electrode current collector, except for a positive electrode lead portion, formed using belt-like aluminum foil with a thickness of 15 μm and was dried. Further, the positive electrode mixture slurry was intermittent-applied on the other surface of the positive electrode current collector except for the positive electrode lead portion and was dried. Then, the mixture layer was compression molded with a rolling press machine, so that a mixture layer on one surface had a thickness of 80 μm, and a positive electrode mixture layer was fabricated.

Slits with predetermined widths were made on the pressed electrode. After that, a protective layer was formed in advance with a PP tape with a thickness of 30 μm over the current collector to be in contact with a lead terminal. After that, an Al lead with a thickness of 100 μm was welded over the current collector by ultrasonic welding so that a welded portion did not overlap with the protective layer, and the lead in an intermediate blank portion and an exposed portion of the Al current collector are covered with a PI tape, so that a positive electrode was fabricated. Note that the protective layer was, as shown in FIGS. 4A and 4B, provided in the center of the exposed surface of the positive electrode current collector and a portion of the center was interposed between the exposed surface of the current collector and a bottom end portion of the lead. Thus, the protective layer was interposed between each of the bottom edge and both side edges of the lead and the positive electrode current collector, and accordingly, the exposed surface of the positive electrode current collector was protected.

[Fabrication of Negative Electrode]

A negative electrode mixture slurry was prepared by mixing 96 parts of crushed graphite powder, which is a negative electrode active material, 2 parts of styrene-butadiene rubber (SBR), which is a binder, and 2 parts of carboxymethylcellulose (CMC) into a deionized water, which is a solvent. Next, the negative electrode mixture slurry was applied uniformly on one surface of a negative electrode current collector formed of copper foil with a thickness of 12 μm and dried, and further was applied uniformly on the other surface thereof and dried. Then, the mixture layer was pressed with a rolling press machine, so that a negative electrode mixture layer was formed. Note that, at this time, the negative electrode mixture layer was formed by performing compression molding so that the volume density thereof was measured as 1.65 g/cm$^3$ after the following treatment: composition of a cell, charge of the cell, discharging the cell to 2.5 V, decomposition of the cell, and then immersion in a DMC solvent for 30 minutes.

Finally, slits with predetermined widths were made on the pressed electrode, and a Ni lead was welded over the current collector by ultrasonic welding, so that a negative electrode was fabricated.

[Fabrication of Electrolyte Solution]

As an electrolyte solution, a mixture containing lithium hexafluorophosphate (LiPF$_6$) as an electrolyte salt in a mixed solvent obtained by mixing ethylene carbonate (EC), ethyl methyl carbonate (EMC), dimethyl carbonate (DMC) so that the volume ratio thereof was EC:EMC:DMC=2:2:6 was used. The concentration of lithium hexafluorophosphate (LiPF$_6$) in the electrolyte solution was 1 mol/dm$^3$.

[Separator]

As a separator, a 20 μm thick porous film of polyethylene was used.

[Fabrication of Batteries for Testing]

In a case of the composition of a secondary battery, the positive electrode and the negative electrode were laminated with the separator interposed therebetween and the laminate was wound, and then a terminal portion of the wound laminate was fixed with an adhesive tape, so that a wound electrode body was fabricated. Next, a center pin was inserted to the center of the winding of the wound electrode body. Then, the wound electrode body was housed in the inside of a battery can formed using iron plated with nickel such that the wound electrode body was interposed between a pair of insulating plates. In this case, an end portion of the positive electrode lead was welded to a safety valve mechanism and an end portion of the negative electrode lead was welded to the battery can. Subsequently, the electrolyte solution was injected into the inside of the battery can by a low pressure method, and impregnated into the separator. Finally, a battery cap, the safety valve mechanism, and a positive temperature coefficient element were caulked in an open end portion of the battery can via a gasket. Thus, a cylindrical battery (with a diameter of 18 mm and a height of 65 mm) was completed. Note that the cell was fabricated such that the cell capacity of the fabricated 18650-sized cylindrical cell was 2.5 Ah.

Example 2

A PI tape was used as the protective layer. The volume density of the negative electrode mixture layer was set to 1.40 g/cm$^3$. Other than the above conditions, the secondary battery was fabricated in the same manner as Example 1.

Example 3

The protective layer was formed to be interposed between the current collector exposed surface and each of the bottom portion and both side portions of the lead, as shown in FIGS. 6A and 6B. Thus, the protective layer was interposed between the current collector exposed surface and a part of the bottom edge and both side edges of the lead, so that the positive electrode current collector exposed surface was protected. A PI tape was used as the protective layer. The volume density of the negative electrode mixture layer was set to 1.40 g/cm$^3$. Other than the above conditions, the secondary battery was fabricated in the same manner as Example 1.

Example 4

The protective layer was formed such that a central portion thereof was positioned over the positive electrode current collector exposed surface, both end portions thereof were positioned over the positive electrode mixture layer, and the central portion thereof was interposed between the current collector exposed surface and the bottom portion of the lead, as shown in FIGS. 5A and 5B. Thus, the protective layer was interposed between the current collector exposed surface and a part of the bottom edge and both side edges of the lead, so that the positive electrode current collector exposed surface was protected. A PI tape was used as the protective layer. The volume density of the negative electrode mixture layer was set to 1.40 g/cm$^3$. Other than the above conditions, the secondary battery was fabricated in the same manner as Example 1.

Example 5

The protective layer was formed to cover a top surface, a bottom surface, and both side surfaces of the bottom portion of the lead 25, as shown in FIGS. 7A and 7B. Thus, the protective layer was interposed between the current collector exposed surface and a part of the bottom edge and both side edges of the lead, so that the positive electrode current collector exposed surface was protected. A PI tape was used as the protective layer. The volume density of the negative electrode mixture layer was set to 1.40 g/cm$^3$. Other than the above conditions, the secondary battery was fabricated in the same manner as Example 1.

Example 6

A PET tape was used as the protective layer. The volume density of the negative electrode mixture layer was set to 1.45 g/cm$^3$. Other than the above conditions, the secondary battery was fabricated in the same manner as Example 1.

Example 7

An applied film of PVdF resin was used as the protective layer. The volume density of the negative electrode mixture layer was set to 1.65 g/cm$^3$. Other than the above conditions, the secondary battery was fabricated in the same manner as Example 1.

Example 8

The thickness of the AL foil was 20 μm. The volume density of the negative electrode mixture layer was set to 1.55 g/cm$^3$. Other than the above conditions, the secondary battery was fabricated in the same manner as Example 1.

Example 9

The thickness of the AL foil was 12 μm. The volume density of the negative electrode mixture layer was set to 1.60 g/cm$^3$. Other than the above conditions, the secondary battery was fabricated in the same manner as Example 1.

Example 10

The thickness of the AL foil was 10 μm. The volume density of the negative electrode mixture layer was set to 1.65 g/cm$^3$. Other than the above conditions, the secondary battery was fabricated in the same manner as Example 1.

Example 11

The volume density of the negative electrode mixture layer was set to 1.75 g/cm$^3$. Other than the above condition, the secondary battery was fabricated in the same manner as Example 1.

Example 12

A carbon tape was used as the protective layer. The volume density of the negative electrode mixture layer was set to 1.55 g/cm$^3$. The thickness of the positive electrode mixture layer per surface was 100 μm. The thickness of the positive electrode lead was 150 μm. Other than the above conditions, the secondary battery was fabricated in the same manner as Example 1.

Example 13

The volume density of the negative electrode mixture layer was set to 1.60 g/cm$^3$. The thickness of the positive electrode mixture layer per surface was 50 μm. Other than the above conditions, the secondary battery was fabricated in the same manner as Example 1.

Example 14

The thickness of the AL foil was 8 μm. The volume density of the negative electrode mixture layer was set to 1.60 g/cm$^3$. Other than the above conditions, the secondary battery was fabricated in the same manner as Example 1.

Comparative Example 1

Figure 11:
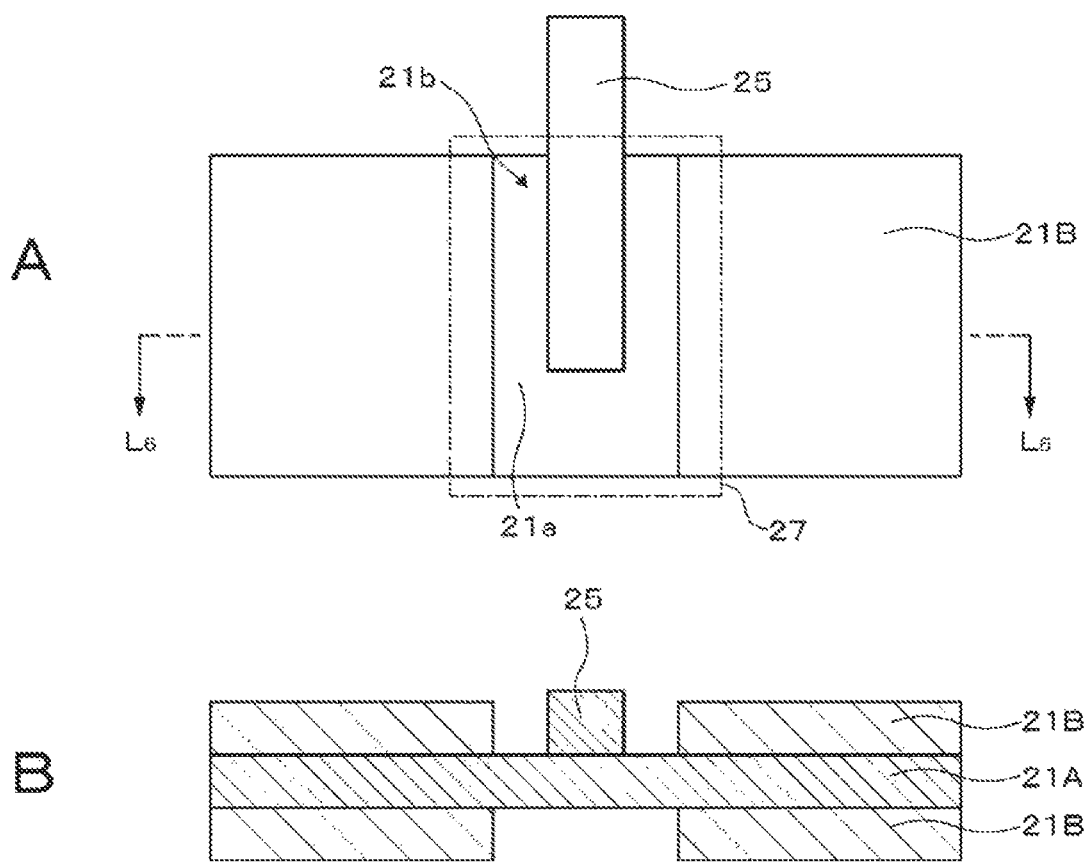
FIG. 11A is a top view of a structure of a protective layer in each of Comparative examples 1 to 3.
FIG. 11B is a cross-sectional view along a line $L_6$-$L_6$ in FIG. 11A.

The thickness of the AL foil was 8 μm. As shown in FIGS. 11A and 11B, the protective layer was not formed. The volume density of the negative electrode mixture layer was set to 1.60 g/cm³. Other than the above conditions, the secondary battery was fabricated in the same manner as Example 1. Note that in FIG. 11B, illustration of the protective tape 27 is omitted.

Comparative Example 2

As shown in FIGS. 11A and 11B, the protective layer was not formed. Other than the above conditions, the secondary battery was fabricated in the same manner as Example 1.

Comparative Example 3

The thickness of the AL foil was 20 μm. As shown in FIGS. 11A and 11B, the protective layer was not formed. The volume density of the negative electrode mixture layer was set to 1.55 g/cm³. Other than the above conditions, the secondary battery was fabricated in the same manner as Example 1.

Comparative Example 4

Figure 12:
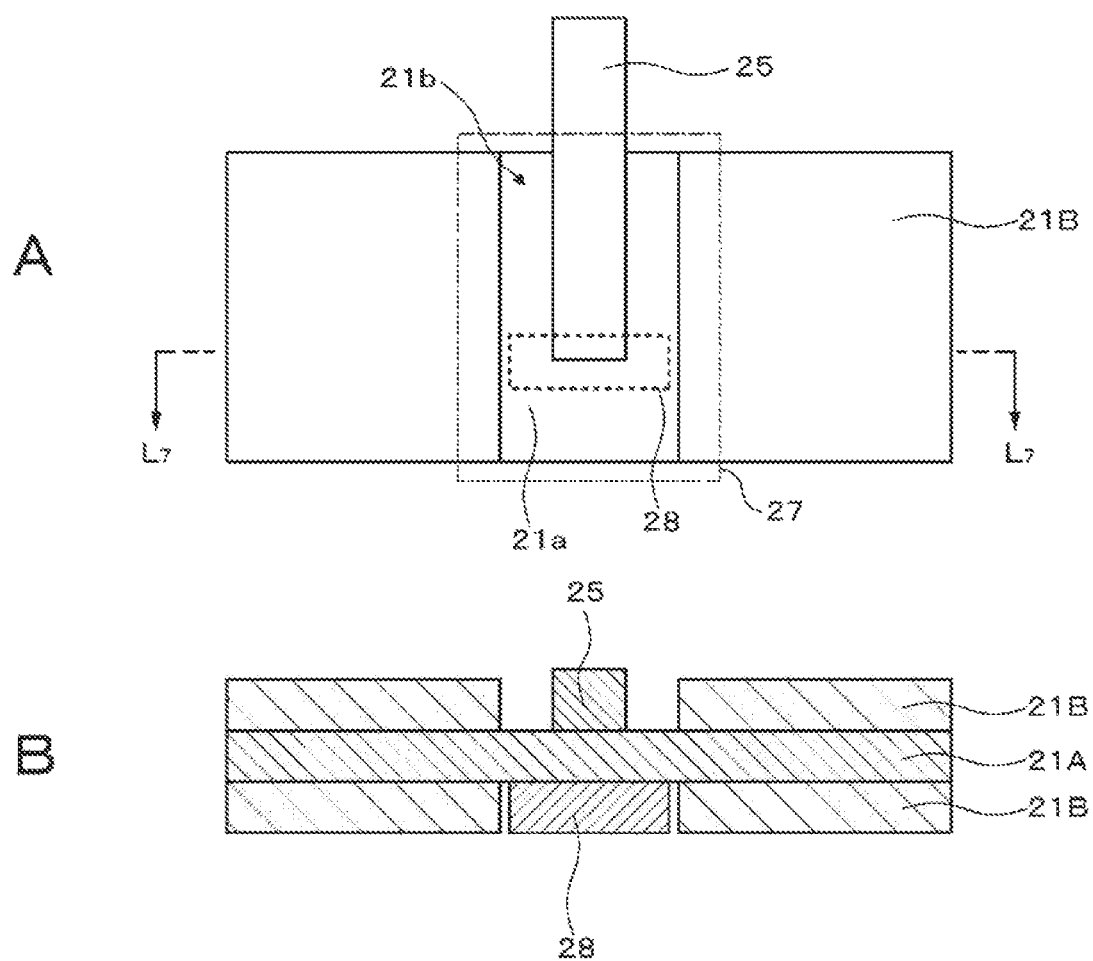
FIG. 12A is a top view of a structure of a protective layer in Comparative example 4.
FIG. 12B is a cross-sectional view along a line $L_7$-$L_7$ in FIG. 12A.

As shown in FIGS. 12A and 12B, the protective layer was formed on the current collector exposed surface that is on the opposite side to the surface where the lead was welded. Other than the above conditions, the secondary battery was fabricated in the same manner as Example 1. Note that in FIG. 12B, illustration of the protective tape 27 is omitted.

Comparative Example 5

Figure 13:
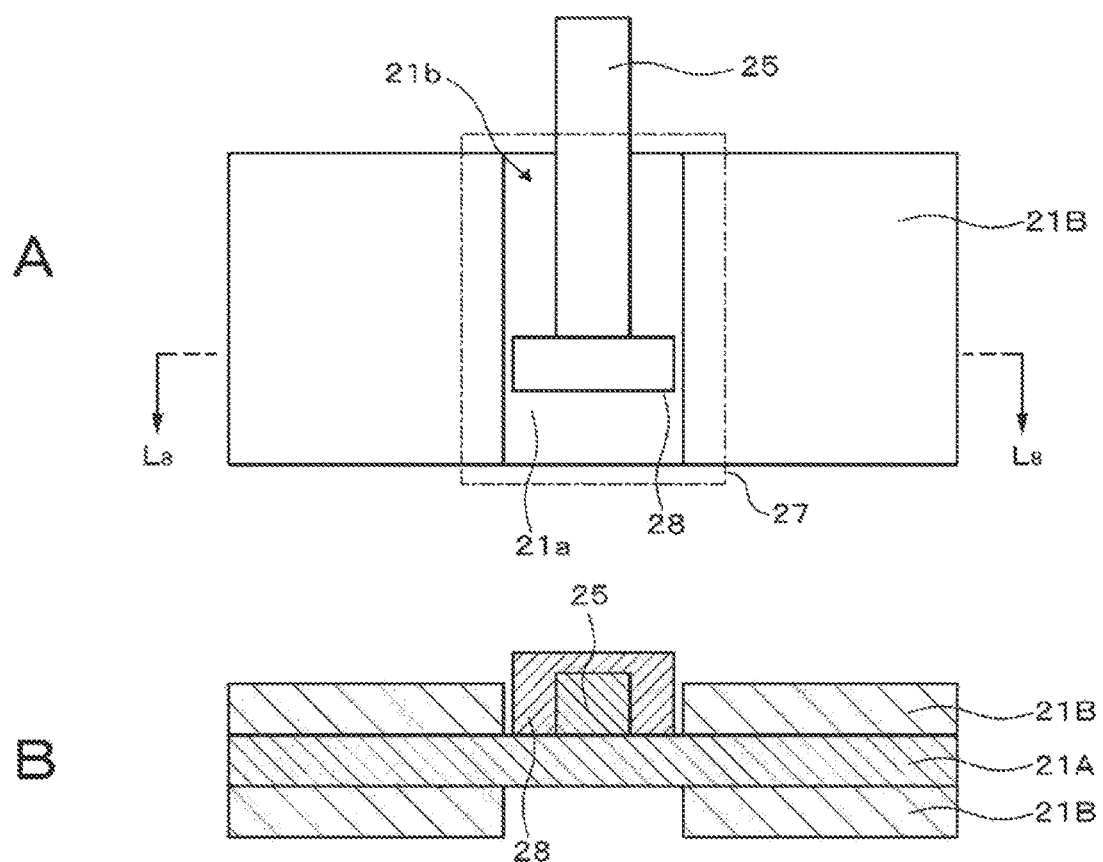
FIG. 13A is a top view of a structure of a protective layer in Comparative example 5.
FIG. 13B is a cross-sectional view along a line $L_8$-$L_8$ in FIG. 13A.

As shown in FIGS. 13A and 13B, the protective layer was formed on a top surface of the bottom portion of the lead 25. Other than the above condition, the secondary battery was fabricated in the same manner as Example 1. Note that in FIG. 13B, illustration of the protective tape 27 is omitted.

For each five samples of the fabricated secondary batteries of Examples 1 to 14 and Comparative examples 1 to 5, evaluation was performed by conducting foil cut testing in the following manner.

[Evaluation of Batteries for Testing (Foil Cut Testing)]

Each battery for testing of Examples and Comparative examples was subjected to fixed current charge in a thermostatic bath at 0° C. and under a condition of 2 Ah, and the fixed current charge was switched to a fixed voltage charge when the battery voltage became 4.2 V. After that, fixed current discharge was performed under a condition of a current density of 5 Ah until the battery voltage became 2.5 V, so that the battery capacity at the time of initial discharge (initial discharge capacity) was measured.

Charge/discharge cycles were repeated under the above conditions, and cycling testing was conducted until the maintenance rate becomes 20% of the initial discharge capacity. After that, the cell was decomposed and it was visually checked whether or not the foil cut occurred in the positive electrode lead portion. The foil cut states were evaluated based on the following standards.

A: No foil cut in five samples out of five samples
B: No foil cut in four samples out of five samples
C: No foil cut in three samples out of five samples
D: No foil cut in two samples out of five samples
E: No foil cut in one sample out of five samples
F: Foil cut in five samples out of five samples Table 1 shows evaluation results of Examples 1 to 14 and Comparative examples 1 to 15.

TABLE 1

| | Al foil thickness [μm] | Structure of protective layer | Type of protective layer | Volume density of negative electrode mixture layer at decomposition [g/cm³] | Positive electrode mixture layer thickness (on one surface) [μm] | Lead thickness [μm] | Foil cut state |
|---|---|---|---|---|---|---|---|
| Example 1 | 15 | FIGS. 4A and 4B | PP tape | 1.65 | 80 | 100 | A |
| Example 2 | 15 | FIGS. 4A and 4B | PI tape | 1.40 | 80 | 100 | A |
| Example 3 | 15 | FIGS. 6A to 6C | PI tape | 1.40 | 80 | 100 | A |
| Example 4 | 15 | FIGS. 5A and 5B | PI tape | 1.40 | 80 | 100 | A |
| Example 5 | 15 | FIGS. 7A and 7B | PI tape | 1.40 | 80 | 100 | A |
| Example 6 | 15 | FIGS. 4A and 4B | PET tape | 1.45 | 80 | 100 | A |
| Example 7 | 15 | FIGS. 4A and 4B | PVdF resin | 1.65 | 80 | 100 | A |
| Example 8 | 20 | FIGS. 4A and 4B | PP tape | 1.55 | 80 | 100 | A |
| Example 9 | 12 | FIGS. 4A and 4B | PP tape | 1.60 | 80 | 100 | A |
| Example 10 | 10 | FIGS. 4A and 4B | PP tape | 1.65 | 80 | 100 | A |
| Example 11 | 15 | FIGS. 4A and 4B | PP tape | 1.75 | 80 | 100 | A |
| Example 12 | 15 | FIGS. 4A and 4B | carbon tape | 1.55 | 100 | 150 | A |
| Example 13 | 15 | FIGS. 4A and 4B | PP tape | 1.60 | 50 | 100 | A |
| Example 14 | 8 | FIGS. 4A and 4B | PP tape | 1.60 | 80 | 100 | B |
| Comparative example 1 | 8 | No protective layer (FIGS. 11A and 11B) | — | 1.60 | 80 | 100 | F |
| Comparative example 2 | 15 | No protective layer (FIGS. 11A and 11B) | — | 1.65 | 80 | 100 | E |
| Comparative example 3 | 20 | No protective layer (FIGS. 11A and 11B) | — | 1.55 | 80 | 100 | C |
| Comparative example 4 | 15 | FIGS. 12A and 12B | PP tape | 1.65 | 80 | 100 | D |
| Comparative example 5 | 15 | FIGS. 13A and 13B | PP tape | 1.65 | 80 | 100 | E |

As shown in Table 1, since the protective layer was interposed between at least a part of the peripheral edge of the lead and the current collector exposed surface in each of Examples 1 to 14, good results were obtained in terms of the foil cut. By contrast, since the protective layer was not provided in each of Comparative examples 1 to 3, good results were not obtained in terms of the foil cut. Further, although the protective layer was provided in each of Comparative examples 4 and 5, the protective layer was not interposed between at least a part of the peripheral edge of the lead and the current collector exposed surface, and accordingly, good results were not obtained either in terms of the foil cut.

4. Other Embodiments

It should be understood by those skilled in the art that various modifications, combinations, sub-combinations and alterations may occur depending on design requirements and other factors insofar as they are within the scope of the appended claims or the equivalents thereof.

For example, the above-described values, structures, shapes, materials, raw materials, manufacturing processes, and the like in the embodiment and Examples are merely examples, and other values, structures, shapes, materials, raw materials, manufacturing processes, and the like may also be used as necessary.

Further, the above-described structures, methods, steps, shapes, materials, values, and the like in the embodiments and Examples can be combined within the scope of the present application.

Figure 14:
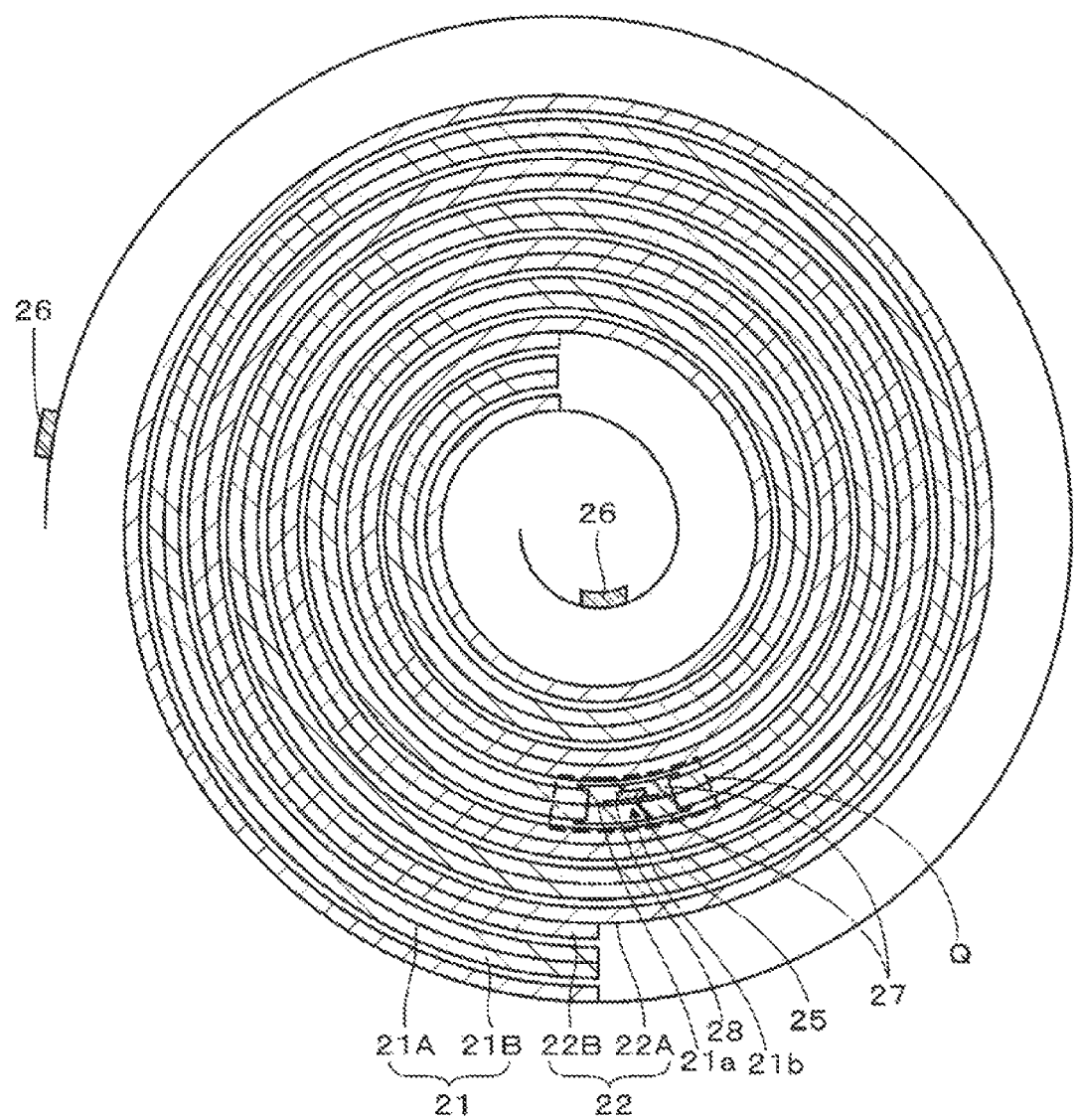
FIG. 14 is a cross-sectional view showing a surface where a wound electrode body is wound in another example of a non-aqueous electrolyte battery according to an embodiment of the present application.

The above-described embodiments have shown the cylindrical non-aqueous electrolyte battery in which one lead 26 connected to the negative electrode is provided in the end portion of the belt-like negative electrode current collector on a winding ending side; however, the present application is not limited to this structure. For example, the following structure is also possible: one lead 26 connected to the negative electrode is provided in the end portion of the belt-like negative electrode current collector on a winding ending side and one lead 26 is provided in an end portion of the belt-like negative electrode current collector on a winding starting side. FIG. 14 shows a cross-sectional view of a surface where the wound electrode body is wound, the wound electrode body being another example of the cylindrical non-aqueous electrolyte battery having such a structure. As shown in FIG. 14, in this wound electrode body 20, one lead 26 connected to the negative electrode 22 is provided in the end portion of the belt-like negative electrode current collector 22A on a winding ending side and one lead 26 is provided in the end portion of the belt-like negative electrode current collector 22A on a winding starting side.

Further, the above-described embodiments have shown the wound electrode body including the positive electrode, the negative electrode, and the separator which is interposed between the positive electrode and the negative electrode and which prevents a short circuit between the positive electrode and the negative electrode; however, an ionic conductor such as a gel-form electrolyte or a solid electrolyte may be used instead of the separator. Alternatively, the wound electrode body may contain, in addition to the separator, an ionic conductor such as a gel-form electrolyte or a solid electrolyte in which a polymer compound expands due to an electrolyte solution. Further, the present application can be applied to a primary battery without limitation to the secondary battery.

Furthermore, the above-described embodiments and Examples have shown the cases where the can was used as a package member; however, a film-form package member may also be used, and the shape thereof may be square or flat, for example.

In the both-surface non-coated portion provided in an almost center in the longitudinal direction of the negative electrode having the mixture layer on the right and left sides of the lead, the protective layer may also be formed to be interposed between at least a part of the peripheral edge of the lead overlapping with the negative electrode current collector exposed surface and the negative electrode current collector exposed surface.

Additionally, the present application may also be configured as below.

(1) A battery including:
    a positive electrode; and
    a negative electrode,
    wherein at least one electrode of the positive electrode and the negative electrode includes
      a current collector,
      a mixture layer over one main surface of the current collector, the mixture layer including a gap through which a part of the current collector is exposed,
      a lead bonded to an exposed surface of the current collector exposed through the gap, and
      a protective layer configured to protect the current collector, at least a part of the protective layer being over the exposed surface of the current collector and interposed between a part of the lead and the exposed surface, and
    wherein the part of the lead includes at least a part of a peripheral edge of the lead.

(2) The battery according to (1), wherein the one electrode is the positive electrode.

(3) The battery according to (2), wherein the part of the peripheral edge of the lead is a bottom edge of the lead.

(4) The battery according to (2) or (3), wherein the part of the peripheral edge of the lead is an entire portion of a bottom edge of the lead and both side edges of the lead overlapping with the exposed surface in a thickness direction.

(5) The battery according to any one of (2) to (4), wherein the current collector has a thickness of greater than or equal to 10 μm and less than or equal to 20 μm.

(6) The battery according to any one of (2) to (5), wherein the mixture layer over the one main surface of both main surfaces of the current collector has a smaller thickness than the lead, the one main surface being on a side bonded to the lead.

(7) The battery according to any one of (2) to (6), wherein the mixture layer of the negative electrode has a volume density of higher than or equal to 1.40 g/cm$^3$ and lower than or equal to 1.75 g/cm$^3$.

(8) The battery according to any one of (1) to (7), further including:
    a wound structure in which the positive electrode and the negative electrode are wound.

(9) An electrode including:
    a current collector;
    a mixture layer over one main surface of the current collector, the mixture layer including a gap through which a part of the current collector is exposed;
    a lead bonded to an exposed surface of the current collector exposed through the gap; and
    a protective layer configured to protect the current collector, at least a part of the protective layer being over the exposed surface of the current collector and interposed between a part of the lead and the exposed surface,
wherein the part of the lead includes at least a part of a peripheral edge of the lead.

(10) A battery pack including:
the battery according to (1);
a controller configured to control the battery; and
a package including the battery.

(11) An electronic device including:
the battery according to (1),
wherein the battery supplies power to the electronic device.

(12) An electric vehicle including:
the battery according to (1)
a conversion device configured to convert power supplied from the battery into driving power of the vehicle; and
a control device configured to perform information processing about vehicle control based on information about the battery.

(13) A power storage device including:
the battery according to (1),
wherein the power storage device supplies power to an electronic device connected to the battery.

(14) The power storage device according to (13), further including:
a power information control device configured to transmit and receive a signal to and from another device via a network,
wherein the power storage device is configured to control charge/discharge of the battery based on information received by the power information control device.

(15) A power system configured to enable power supply from the battery according to (1), or to enable power supply to the battery according to (1) from a power generation device or a power network.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery comprising:
a positive electrode; and
a negative electrode,
wherein at least one electrode of the positive electrode and the negative electrode includes
a current collector,
a mixture layer over one main surface of the current collector, the mixture layer including a gap through which a part of the current collector is exposed,
a lead bonded to an exposed surface of the current collector exposed through the gap, and
a protective layer configured to protect the current collector, wherein the protective layer includes at least one of a resin material and a carbon material, and the protective layer is provided away from edges of the current collector and is over the exposed surface of the current collector and the protective layer interposes between an end part of the lead and the exposed surface of the current collector,
wherein the end part of the lead includes an entire end edge portion and two side edge portions of the lead, and the protective layer separates the entire end edge portion of the lead from the exposed surface of the current collector,
wherein the entire end edge portion of the lead is not in contact with the exposed surface of the current collector and at least a portion of the two side edge portions is in contact with the exposed surface of the current collector, and
wherein at least one end portion of the protective layer is positioned over the mixture layer.

2. The battery according to claim 1, wherein the one electrode is the positive electrode.

3. The battery according to claim 2, wherein the end edge portion of the lead is a bottom end edge portion of the lead.

4. The battery according to claim 2, wherein the end edge portion of the lead is an entire portion of a bottom end edge portion of the lead and both side edges of the lead overlapping with the exposed surface in a thickness direction.

5. The battery according to claim 2, wherein the current collector has a thickness of greater than or equal to 10 μm and less than or equal to 20 μm.

6. The battery according to claim 2, wherein the mixture layer over the one main surface of both main surfaces of the current collector has a smaller thickness than the lead, the one main surface being on a side bonded to the lead.

7. The battery according to claim 2, wherein a mixture layer of the negative electrode has a volume density of higher than or equal to 1.40 g/cm$^3$ and lower than or equal to 1.75 g/cm$^3$.

8. The battery according to claim 1, further comprising:
a wound structure in which the positive electrode and the negative electrode are wound.

9. The battery according to claim 1, wherein the resin material includes at least one of polyvinylidene difluoride, polyimide, or polyethylene terephthalate.

10. The battery according to claim 1, wherein the gap is provided in a substantial central portion in a longitudinal direction of the at least one electrode of the positive electrode and the negative electrode, and wherein the exposed surface of the current collector is exposed through the gap.

11. The battery according to claim 1, wherein the mixture layer is positioned on left and right sides of the lead.

12. The battery according to claim 1, wherein the end edge portion of the lead is provided between both side ends of the current collector.

13. A battery pack comprising:
the battery according to claim 1;
a controller configured to control the battery; and
a package including the battery.

14. An electronic device comprising:
the battery according to claim 1,
wherein the battery supplies power to the electronic device.

15. An electric vehicle comprising:
the battery according to claim 1;
a conversion device configured to convert power supplied from the battery into driving power of the vehicle; and
a control device configured to perform information processing about vehicle control based on information about the battery.

16. A power storage device comprising:
the battery according to claim 1,
wherein the power storage device supplies power to an electronic device connected to the battery.

17. The power storage device according to claim 16, further comprising:

a power information control device configured to transmit and receive a signal to and from another device via a network, wherein the power storage device is configured to control charge/discharge of the battery based on information received by the power information control device.

18. A power system configured to enable power supply from the battery according to claim 1, or to enable power supply to the battery according to claim 1 from a power generation device or a power network.

19. An electrode comprising:
a current collector;
a mixture layer over one main surface of the current collector, the mixture layer including a gap through which a part of the current collector is exposed;
a lead bonded to an exposed surface of the current collector exposed through the gap; and
a protective layer configured to protect the current collector, wherein the protective layer includes at least one of a resin material and a carbon material, and the protective layer is provided away from edges of the current collector and is over the exposed surface of the current collector and the protective layer interposes between an end part of the lead and the exposed surface of the current collector, wherein the end part of the lead includes an entire end edge portion and two side edge portions of the lead, and the protective layer separates the entire end edge portion of the lead from the exposed surface of the current collector, wherein the entire end edge portion of the lead is not in contact with the exposed surface of the current collector and at least a portion of the two side edge portions is in contact with the exposed surface of the current collector, and wherein at least one end portion of the protective layer is positioned over the mixture layer.

* * * * *